United States Patent
Beall et al.

(10) Patent No.: US 8,999,224 B2
(45) Date of Patent: Apr. 7, 2015

(54) CORDIERITE POROUS CERAMIC HONEYCOMB ARTICLES WITH DELAYED MICROCRACK EVOLUTION

(75) Inventors: Douglas Munroe Beall, Painted Post, NY (US); Gregory Albert Merkel, Corning, NY (US); Martin Joseph Murtagh, Trumansburg, NY (US)

(73) Assignee: Corning Incorporated, Corning, NY (US)

( * ) Notice: Subject to any disclaimer, the term of this patent is extended or adjusted under 35 U.S.C. 154(b) by 566 days.

(21) Appl. No.: 12/956,378

(22) Filed: Nov. 30, 2010

(65) Prior Publication Data

US 2012/0135186 A1    May 31, 2012

(51) Int. Cl.
*C04B 35/195* (2006.01)
*C04B 38/00* (2006.01)
(Continued)

(52) U.S. Cl.
CPC ........... *C04B 38/0006* (2013.01); *B01D 46/244* (2013.01); *B01D 46/2444* (2013.01); *B01D 46/247* (2013.01); *B01D 2046/2496* (2013.01); *B01J 35/04* (2013.01); *B01J 37/0215* (2013.01);
(Continued)

(58) Field of Classification Search
CPC .......................... C04B 35/195; C04B 38/0006
USPC ................................................ 264/630, 631
See application file for complete search history.

(56) References Cited

U.S. PATENT DOCUMENTS 4,329,162 A * 5/1982 Pitcher, Jr. .................. 55/523
4,557,773 A * 12/1985 Bonzo ......................... 156/64
(Continued)

FOREIGN PATENT DOCUMENTS

WO   2008/005291   1/2008   ............ C04B 35/195
WO   2008/027422   3/2008   ............ C04B 35/195
(Continued)

OTHER PUBLICATIONS

"Global model for calculating room-temperature glass density from the composition"; Fluegel; Journal of the American Ceramics Society; 90(8)2622-2625(2007).
(Continued)

*Primary Examiner* — Joseph S Del Sole
*Assistant Examiner* — Russell Kemmerle, III
(74) *Attorney, Agent, or Firm* — Charles A. Greene

(57) ABSTRACT

A porous ceramic honeycomb article includes a primary cordierite phase and an intercrystalline glass phase. In an as-fired condition, the porous ceramic honeycomb article exhibits microcrack parameter $Nb^3 \leq 0.06$ and an as-fired $E_{500°\ C.}/E_{25°\ C.}$ ratio $\leq 0.99$. The article exhibits a coated microcrack parameter $Nb^3 \leq 0.14$ and a coated $E_{500°\ C.}/E_{25°\ C.}$ ratio $\leq 1.06$ after the porous ceramic honeycomb article has been washcoated and calcined at a temperature of 550° C. After the article is exposed to a thermal treatment at a temperature $\geq 800°$ C. following washcoating and calcining, at least a first portion of the porous ceramic honeycomb article has a first treated microcrack parameter $Nb^3 \geq 0.18$, and a first treated mean coefficient of thermal expansion of not more than $12 \times 10^{-7}/°$ C. over a temperature range of 25° C. to 800° C. Methods of forming the porous ceramic honeycomb article are also disclosed.

13 Claims, 8 Drawing Sheets

(51) Int. Cl.
  *B01J 35/04* (2006.01)
  *C04B 35/636* (2006.01)
  *C04B 35/638* (2006.01)
  *B01D 46/24* (2006.01)
  *B01J 37/02* (2006.01)
  *C04B 111/00* (2006.01)
  *C04B 111/20* (2006.01)
  *C04B 111/34* (2006.01)

(52) U.S. Cl.
  CPC ........... *C04B 35/195* (2013.01); *C04B 35/6365* (2013.01); *C04B 35/638* (2013.01); *C04B 2111/00793* (2013.01); *C04B 2111/0081* (2013.01); *C04B 2111/2084* (2013.01); *C04B 2111/343* (2013.01); *C04B 2235/3206* (2013.01); *C04B 2235/3213* (2013.01); *C04B 2235/3217* (2013.01); *C04B 2235/3222* (2013.01); *C04B 2235/3225* (2013.01); *C04B 2235/3227* (2013.01); *C04B 2235/3418* (2013.01); *C04B 2235/3445* (2013.01); *C04B 2235/3472* (2013.01); *C04B 2235/349* (2013.01); *C04B 2235/425* (2013.01); *C04B 2235/6021* (2013.01); *C04B 2235/786* (2013.01); *C04B 2235/787* (2013.01); *C04B 2235/85* (2013.01); *C04B 2235/9607* (2013.01); *C04B 2235/9615* (2013.01)

(56) References Cited

U.S. PATENT DOCUMENTS

| | | | |
|---|---|---|---|
| 4,573,896 A * | 3/1986 | Bonzo | 425/125 |
| 5,069,697 A * | 12/1991 | Hamaguchi et al. | 55/523 |
| 5,114,644 A * | 5/1992 | Beall et al. | 264/631 |
| 5,177,039 A | 1/1993 | Allaire et al. | 501/95 |
| 5,185,110 A * | 2/1993 | Hamaguchi et al. | 264/44 |
| 5,258,150 A * | 11/1993 | Merkel et al. | 264/43 |
| 5,275,771 A | 1/1994 | Bush et al. | 264/63 |
| 5,409,870 A | 4/1995 | Locker et al. | 501/119 |
| 5,549,725 A * | 8/1996 | Kasai et al. | 55/523 |
| 5,634,952 A * | 6/1997 | Kasai et al. | 55/302 |
| 6,080,356 A * | 6/2000 | Miura et al. | 264/631 |
| 6,101,793 A * | 8/2000 | Nagai et al. | 55/523 |
| 6,210,626 B1 * | 4/2001 | Cornelius et al. | 264/631 |
| 6,541,407 B2 * | 4/2003 | Beall et al. | 501/119 |
| 6,673,414 B2 * | 1/2004 | Ketcham et al. | 428/116 |
| 6,696,132 B2 * | 2/2004 | Beall et al. | 428/116 |
| 6,752,969 B1 * | 6/2004 | Nishimura et al. | 422/180 |
| 6,773,481 B2 * | 8/2004 | Noguchi et al. | 55/523 |
| 6,803,086 B2 * | 10/2004 | Noguchi et al. | 428/116 |
| 6,809,139 B2 * | 10/2004 | Fabian et al. | 524/430 |
| 6,814,774 B2 * | 11/2004 | Ishihara et al. | 55/523 |
| 6,818,580 B2 * | 11/2004 | Kumazawa et al. | 501/119 |
| 6,827,754 B2 * | 12/2004 | Suwabe et al. | 55/523 |
| 6,843,822 B2 * | 1/2005 | Beall et al. | 55/523 |
| 6,864,198 B2 * | 3/2005 | Merkel | 501/80 |
| 7,122,612 B2 * | 10/2006 | Tao et al. | 526/317.1 |
| 7,132,150 B2 * | 11/2006 | Ogunwumi et al. | 428/117 |
| 7,138,003 B2 * | 11/2006 | Ichikawa et al. | 55/523 |
| 7,141,087 B2 * | 11/2006 | Noguchi et al. | 55/523 |
| 7,141,089 B2 * | 11/2006 | Beall et al. | 55/523 |
| 7,247,184 B2 * | 7/2007 | Frost | 55/523 |
| 7,520,911 B2 | 4/2009 | Beall et al. | 55/523 |
| 7,575,794 B2 | 8/2009 | Faber et al. | 428/116 |
| 7,618,699 B2 * | 11/2009 | Beall et al. | 428/116 |
| 7,648,550 B2 * | 1/2010 | Beall et al. | 55/523 |
| 7,704,296 B2 * | 4/2010 | Merkel | 55/523 |
| 7,811,652 B2 * | 10/2010 | Makino et al. | 428/116 |
| 7,927,682 B2 * | 4/2011 | Beall et al. | 428/116 |
| 7,960,009 B2 * | 6/2011 | Backhaus-Ricoult et al. | 428/116 |
| 7,964,262 B2 * | 6/2011 | Brocheton et al. | 428/116 |
| 8,377,370 B2 * | 2/2013 | Merkel | 264/631 |
| 8,389,101 B2 * | 3/2013 | Merkel | 428/116 |
| 2005/0037147 A1 * | 2/2005 | Ogunwumi et al. | 427/393.6 |
| 2005/0056974 A1 * | 3/2005 | Suzuki et al. | 264/605 |
| 2006/0272306 A1 * | 12/2006 | Kirk et al. | 55/523 |
| 2007/0142208 A1 * | 6/2007 | Addiego et al. | 501/109 |
| 2007/0281127 A1 | 12/2007 | Backhaus-Ricoult et al. | 428/116 |
| 2008/0032090 A1 * | 2/2008 | Beall et al. | 428/116 |
| 2008/0032091 A1 * | 2/2008 | Beall et al. | 428/116 |
| 2008/0047243 A1 * | 2/2008 | Beall et al. | 55/523 |
| 2008/0057267 A1 * | 3/2008 | Brocheton et al. | 428/116 |
| 2008/0063833 A1 | 3/2008 | Beall et al. | 428/116 |
| 2008/0286179 A1 * | 11/2008 | Liu et al. | 422/310 |
| 2009/0137382 A1 * | 5/2009 | Merkel | 502/60 |
| 2009/0220733 A1 * | 9/2009 | Backhaus-Ricoult et al. | 428/116 |
| 2009/0220736 A1 * | 9/2009 | Merkel | 428/116 |
| 2009/0239741 A1 * | 9/2009 | Makino et al. | 502/251 |
| 2009/0297764 A1 * | 12/2009 | Beall et al. | 428/116 |
| 2010/0126132 A1 | 5/2010 | Merkel | 55/523 |
| 2010/0156010 A1 * | 6/2010 | Merkel | 264/628 |
| 2010/0304082 A1 * | 12/2010 | Merkel | 428/116 |
| 2011/0291313 A1 * | 12/2011 | Miao et al. | 264/44 |
| 2011/0293883 A1 * | 12/2011 | Miao et al. | 428/116 |
| 2012/0134891 A1 * | 5/2012 | Boger et al. | 422/211 |
| 2012/0177875 A1 * | 7/2012 | Beall et al. | 428/116 |

FOREIGN PATENT DOCUMENTS

| | | | |
|---|---|---|---|
| WO | 2009/005679 | 1/2009 | C04B 35/195 |
| WO | 2009/108357 | 9/2009 | C04B 35/195 |

OTHER PUBLICATIONS

"Unified theory of thermal shock fracture initiation and crack propagation in brittle ceramics"; Materials Research Center, Allied Chemical Corporation, Morristown, NJ; Hasselman; p. 600-604; Journal of the American Ceramic Society; vol. 52, No. 11.

* cited by examiner

CORDIERITE POROUS CERAMIC HONEYCOMB ARTICLES WITH DELAYED MICROCRACK EVOLUTION

BACKGROUND

1. Field

The present specification generally relates to porous ceramic honeycomb articles and, more specifically, to cordierite porous ceramic honeycomb articles for use as filter materials.

2. Technical Background

Wall-flow diesel particulate filters (DPFs), gasoline particulate filters (GPFs) and ceramic catalyst supports generally comprise thin-walled ceramic honeycomb articles with high geometric surface areas and, in some cases, extensive interconnected porosity to facilitate fluid filtration. Ceramic filters, in particular, must exhibit high mechanical strength to facilitate handling and superior thermal shock resistance in operation to prevent degradation of the filter.

Cordierite honeycombs employed in exhaust gas aftertreatment applications generally have low coefficients of thermal expansion and low Young's elastic modulus as a result of microcracks in the ceramic phase in the as-fired condition, attributes which are beneficial to thermal shock resistance. However, when such highly microcracked ceramics are washcoated with a catalyst washcoat, the catalyst washcoat penetrates into the microcracks, which can cause an increase in the CTE and elastic modulus of the article as the catalyst washcoat in the microcracks prevents the microcracks from closing during temperature excursions. Furthermore, the acidic solution typically employed in commercial washcoating systems can result in extension of the lengths of the pre-existing microcracks by stress corrosion, causing a reduction in the strength of the ceramic.

One solution to this problem has been to create a temporary "passivation" coating the microcracks as a barrier to the penetration of the catalyst washcoat into the microcracks during the coating process. This passivation step adds cost due to additional equipment, expended chemicals, and processing time, but is necessary to protect the thermal shock performance of the product. Another approach which has been taken to eliminate the problem of degradation in the thermophysical properties of cordierite honeycomb ceramics during washcoating has been the elimination of microcracks from the as-fired ceramic matrix (see references). The increase in the coefficient of thermal expansion associated with the elimination of microcracks can be balanced by an increase in strain tolerance (MOR/E) at higher porosity. However, the development of small degrees of microcracking during use can result in a substantial decrease in strength and reduction in strain tolerance without a substantial decrease in CTE, thereby resulting in a decrease in thermal shock resistance.

Accordingly, a need exists for alternative porous ceramic honeycomb articles which are less susceptible to thermally induced cracking and alternative methods for manufacturing the same.

SUMMARY

According to one embodiment, a method for forming a porous ceramic honeycomb article includes forming a batch mixture comprising cordierite-forming raw materials, glass-forming raw materials, at least one ceramic processing aid and water. The batch mixture is extruded into a green honeycomb article and fired under conditions sufficient to produce a porous ceramic honeycomb article having a primary cordierite phase and an intercrystalline glass phase. After firing, the porous ceramic honeycomb article exhibits an as-fired microcrack parameter $Nb^3 \leq 0.06$. Thereafter, the porous ceramic honeycomb article is washcoated and calcined, after which the porous ceramic honeycomb article exhibits a coated microcrack parameter $Nb^3 \leq 0.14$ and a coated $E_{500° C.}/E_{25° C.}$ ratio $\leq 1.06$. Finally, the porous ceramic honeycomb article is thermally treated such that at least a first portion of the porous ceramic honeycomb article exhibits a first treated microcrack parameter $Nb^3 \geq 0.18$, a first treated $E_{500° C.}/E_{25° C.}$ ratio $\leq 1.06$, and a first treated mean coefficient of thermal expansion of less than $12 \times 10^{-7}/°$ C. over a temperature range of 25° C. to 800° C. after the thermal treating.

In another embodiment, a porous ceramic honeycomb article includes a primary cordierite phase and an intercrystalline glass phase. The porous ceramic honeycomb article has an as-fired microcrack parameter $Nb^3 \leq 0.06$, a coated microcrack parameter $Nb^3 \leq 0.14$ and a coated $E_{500° C.}/E_{25° C.}$ ratio $\leq 1.06$ after the porous ceramic honeycomb article has been washcoated and calcined at a temperature of 550° C. Following exposure to a thermal treatment at a temperature $\geq 800°$ C. after washcoating and calcining, at least a first portion of the porous ceramic honeycomb article has a first treated microcrack parameter $Nb^3 \geq 0.18$, a first treated $E_{500° C.}/E_{25° C.}$ ratio $\leq 1.06$, and a first treated mean coefficient of thermal expansion of less than $12 \times 10^{-7}/°$ C. over a temperature range of 25° C. to 800° C.

Additional features and advantages of the invention will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

Figure 6:
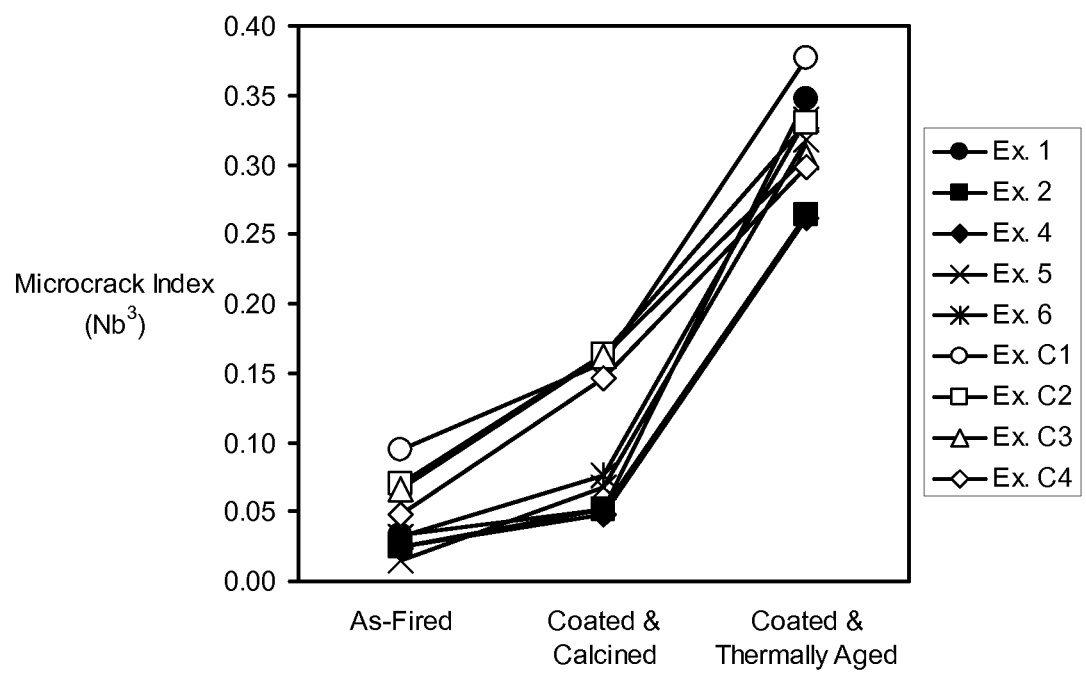
Figure 7:
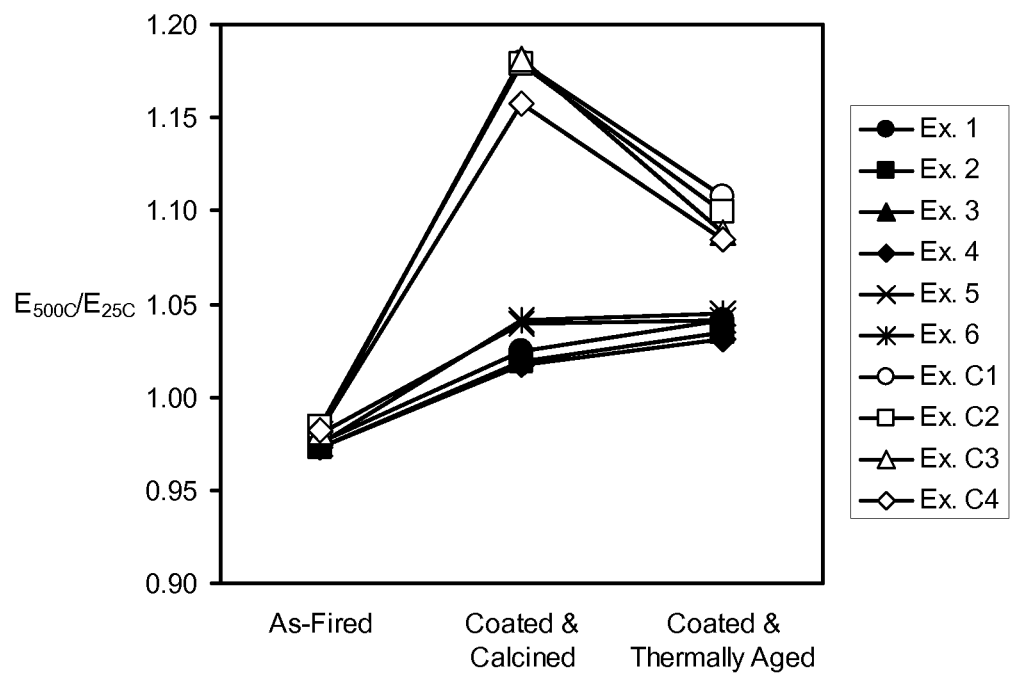
Figure 8:
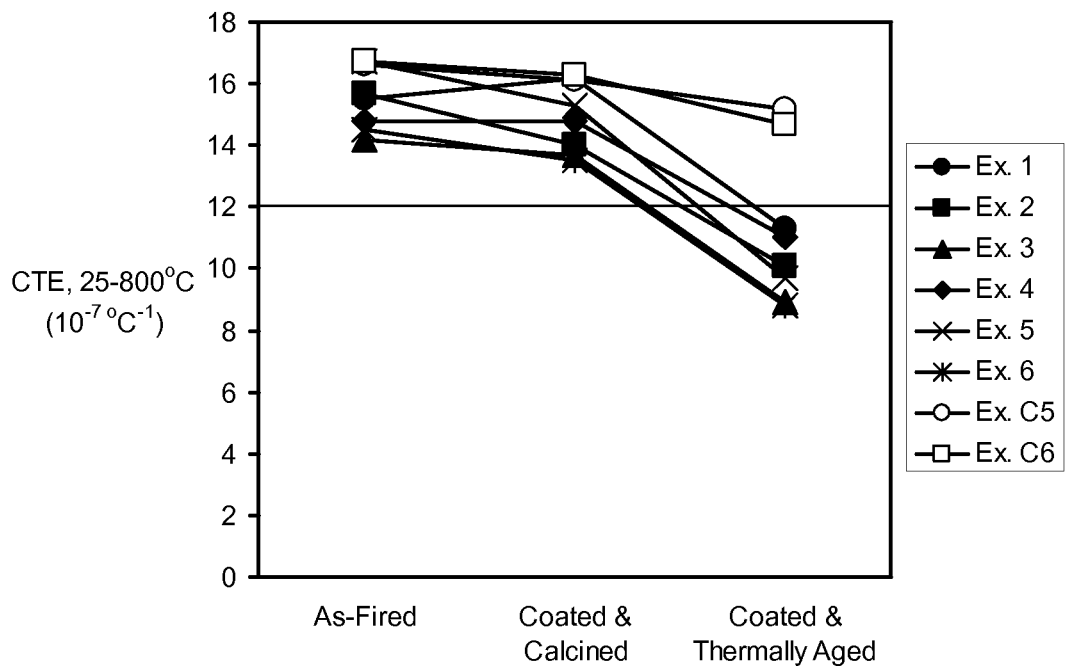
Figure 9:
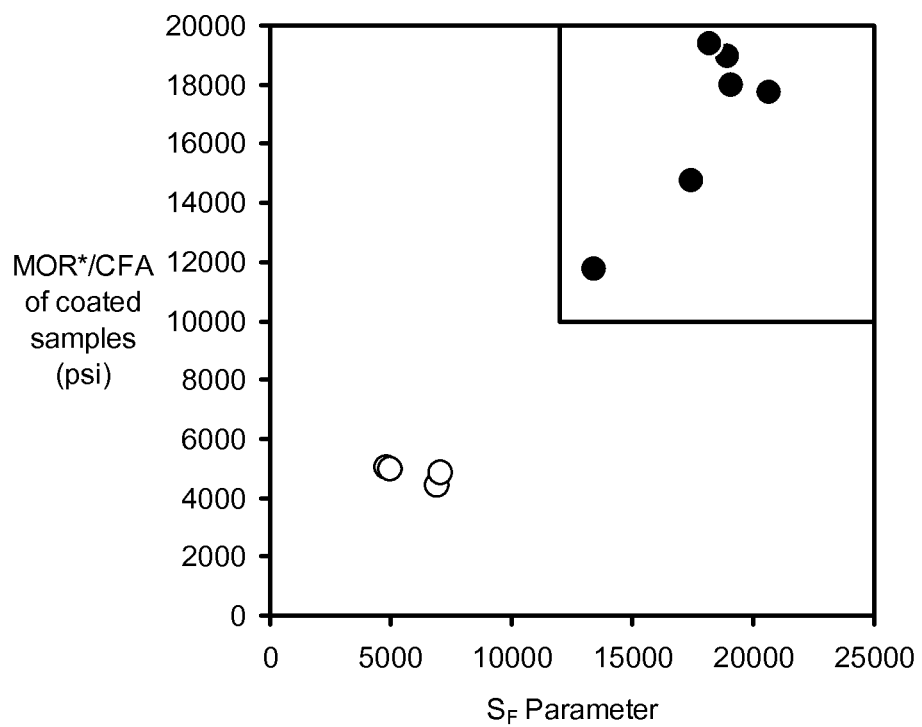
Figure 10:
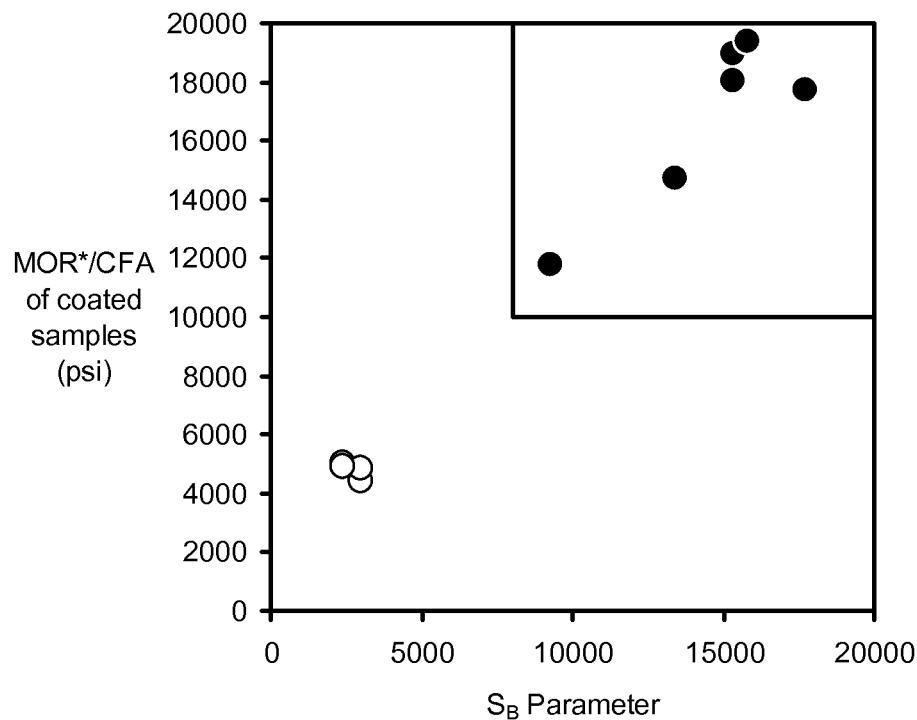
Figure 11:
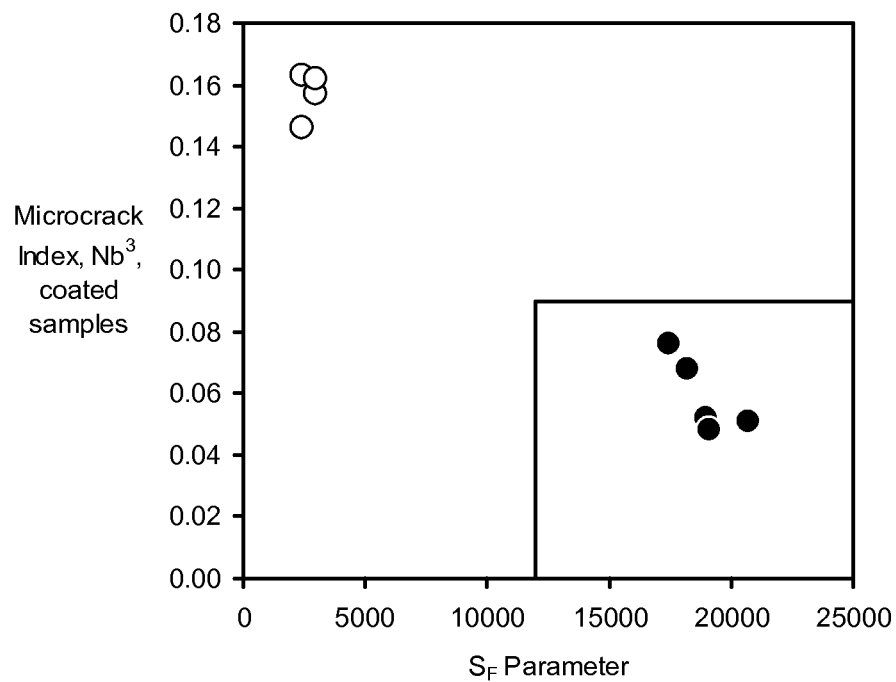
Figure 12:
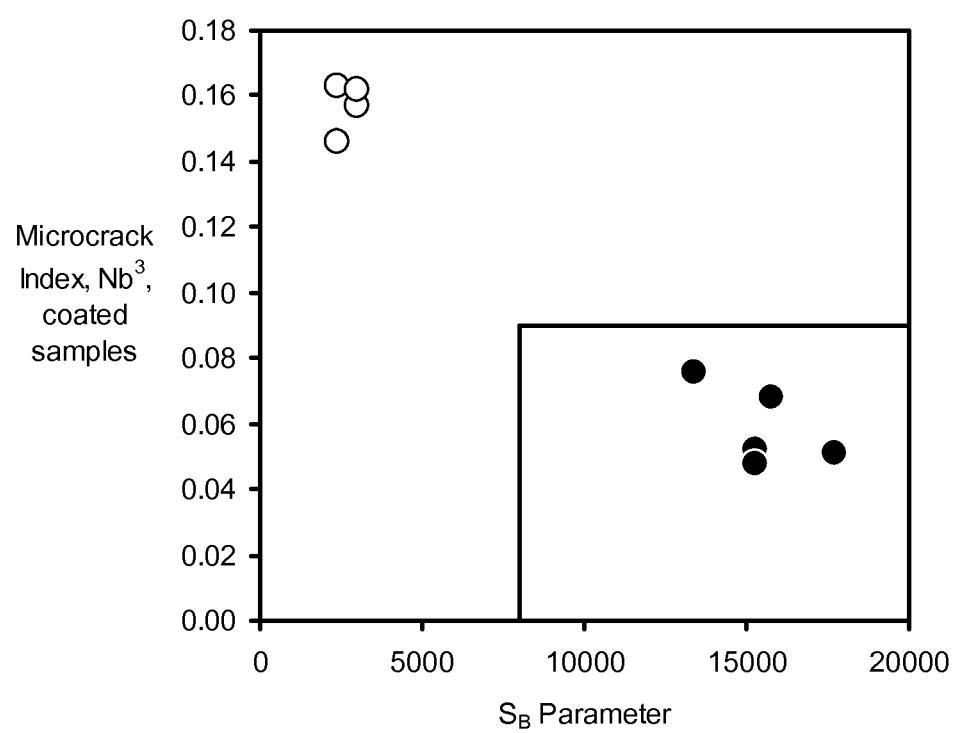
Figure 13:
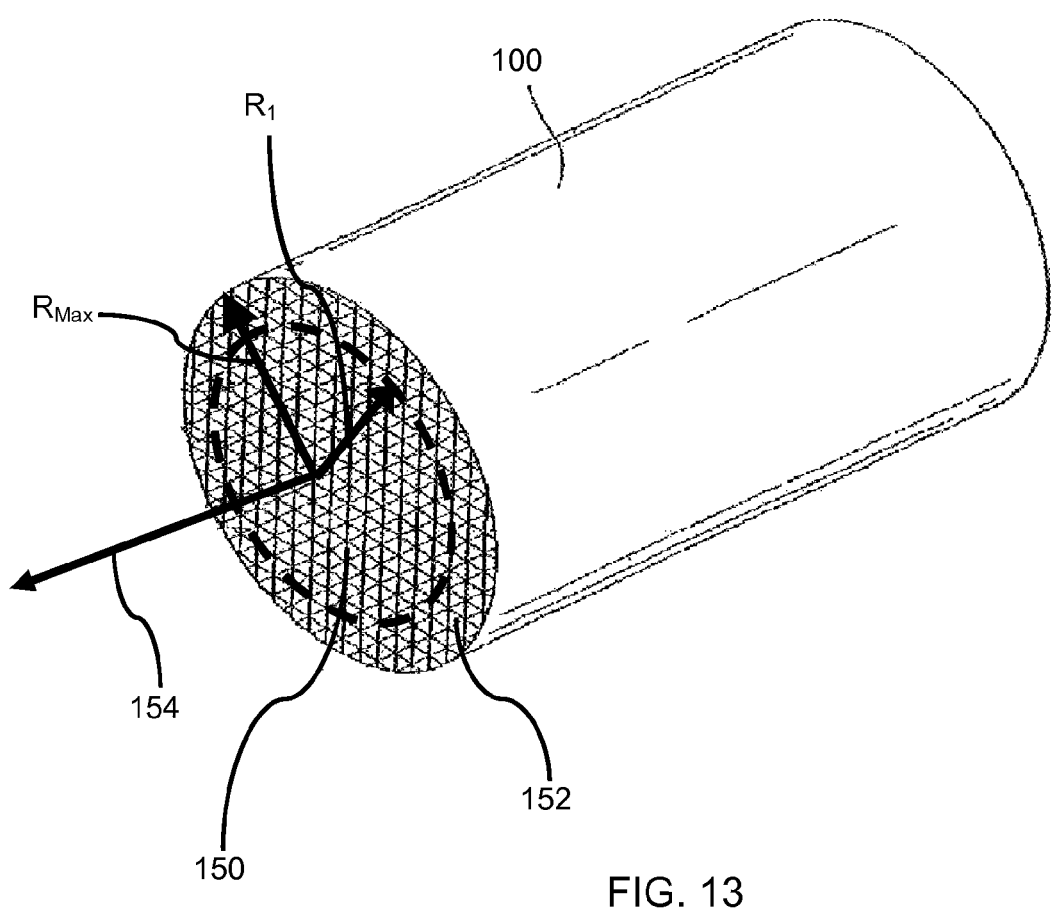

as-fired, (2) after washcoating and calcining, and (3) after thermal treatment at 800-1100° C., showing the higher retention of strength, normalized to zero porosity, of the Inventive Examples after washcoating;

FIG. 6 graphically depicts the values of the microcrack index, $Nb^3$, for Inventive and Comparative Examples at three conditions: (1) as-fired, (2) after washcoating and calcining, and (3) after thermal treatment at 800-1100° C., showing the retention of low microcracking of the Inventive Examples after washcoating, and the substantial increase in microcracking of the Inventive Examples after thermal treatment at 800-1100° C.;

FIG. 7 graphically depicts the values of $E_{500°\ C.}/E_{25°\ C.}$ for Inventive and Comparative Examples at three conditions: (1) as-fired, (2) after washcoating and calcining, and (3) after thermal treatment at 800-1100° C., showing the lower values of $E_{500°\ C.}/E_{25°\ C.}$ for the Inventive Examples after washcoating, which indicates a lower degree of penetration of the washcoat into the microcracks in the Inventive Examples;

FIG. 8 graphically depicts the values of CTE (25-800° C.) for Inventive and Comparative Examples at three conditions: (1) as-fired, (2) after washcoating and calcining, and (3) after thermal treatment at 800-1100° C., showing the decrease in CTE of the Inventive Examples after thermal treatment to values less than $12 \times 10^{-7}$° $C.^{-1}$, whereas Comparative Examples C5 to C7 do not undergo a sufficient decrease in CTE to provide good thermal shock resistance;

FIG. 9 graphically depicts MOR*/CFA after washcoating and calcination versus the $S_F$ parameter for Inventive Examples (filled circles) and Comparative Examples (open circles);

FIG. 10 graphically depicts MOR*/CFA after washcoating and calcination versus the $S_B$ parameter for Inventive Examples (filled circles) and Comparative Examples (open circles);

FIG. 11 is a plot of the microcrack index, $Nb^3$, after washcoating and calcination versus the $S_F$ parameter for Inventive Examples (filled circles) and Comparative Examples (open circles);

FIG. 12 graphically depicts the microcrack index, $Nb^3$, after washcoating and calcination versus the $S_B$ parameter for Inventive Examples (filled circles) and Comparative Examples (open circles);

FIG. 13 schematically depicts a method for thermally treating a porous ceramic honeycomb article according to one or more embodiments shown and described herein.

DETAILED DESCRIPTION

Figure 1:
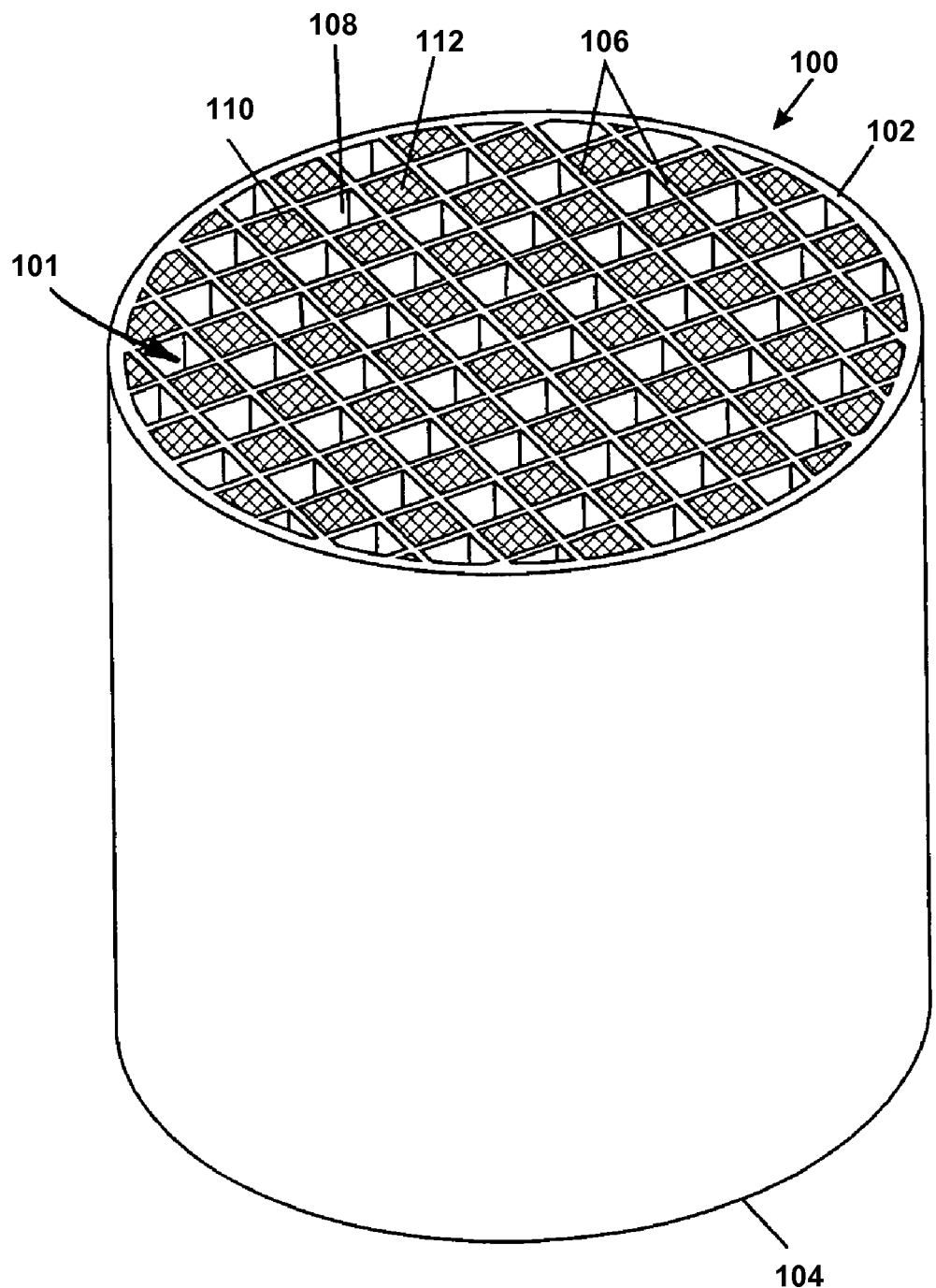
FIG. 1 schematically depicts a porous ceramic honeycomb article according to one or more embodiments shown and described herein.

Reference will now be made in detail to various embodiments of cordierite porous ceramic honeycomb articles, and methods for making the same. Whenever possible, the same reference numerals will be used throughout the drawings to refer to the same or like parts. One embodiment of a porous honeycomb article is schematically depicted in FIG. 1. In an as-fired condition, the cordierite porous ceramic honeycomb article generally comprises a primary cordierite phase and an intercrystalline glass phase such that the cordierite porous ceramic honeycomb article exhibits an as-fired microcrack parameter $Nb^3 \leq 0.06$ and an as-fired $E_{500°\ C.}/E_{25°\ C.}$ ratio $\leq 0.99$. Following washcoating and calcining, the cordierite porous ceramic honeycomb article has a coated microcrack parameter $Nb^3 \leq 0.14$ and a coated $E_{500°\ C.}/E_{25°\ C.}$ ratio $\leq 1.06$. After the porous ceramic honeycomb article is exposed to a thermal treatment following washcoating and calcining, at least a first portion of the porous ceramic honeycomb article has a first treated microcrack parameter $Nb^3 \geq 0.18$, and a first treated mean coefficient of thermal expansion of less than $12 \times 10^{-7}$/° C. over a temperature range of 25° C. to 800° C. The cordierite porous ceramic honeycomb articles and methods of forming the same will be described in more detail herein.

Referring now to FIG. 1, a porous ceramic honeycomb article 100 formed from cordierite is schematically depicted. The porous ceramic honeycomb article 100 may be used as a wall-flow filter for particulate matter filtration from a vehicle exhaust. The porous ceramic honeycomb article 100 generally comprises a porous cordierite ceramic honeycomb body having a plurality of cell channels 101 extending between a first end 102 and a second end 104. The honeycomb structure of the article 100 may include the plurality of generally parallel cell channels 101 formed by, and at least partially defined by, intersecting porous cell walls 106 that extend from the first end 102 to the second end 104. The porous ceramic honeycomb article 100 may also include a skin formed about and surrounding the plurality of cell channels. This skin may be extruded during the formation of the cell walls 106 or formed in later processing as an after-applied skin, such as by applying a skinning cement to the outer peripheral portion of the cells.

In one embodiment, the plurality of parallel cell channels 101 are generally square in cross section. However, in alternative embodiments, the plurality of parallel cell channels in the article may have other cross-sectional configurations, including rectangular, round, oblong, triangular, octagonal, hexagonal, or combinations thereof. For honeycombs utilized in filter applications, certain cells are designated as inlet cells 108 and certain other cells are designated as outlet cells 110. Moreover, in a porous ceramic honeycomb article 100, at least some of the cells may be plugged with plugs 112. Generally, the plugs 112 are arranged at or near the ends of the cell channels and are arranged in some defined pattern, such as in the checkerboard pattern shown in FIG. 1, with every other cell being plugged at an end. The inlet channels 108 may be plugged at or near the second end 104, and the outlet channels 110 may be plugged at or near the first end 102 on channels not corresponding to the inlet channels. Accordingly, each cell may be plugged at or near one end of the porous ceramic honeycomb article only. While FIG. 1 generally depicts a checkerboard plugging pattern, it should be understood that alternative plugging patterns may be used in the porous ceramic honeycomb article.

While FIG. 1 depicts a porous ceramic honeycomb article 100 in which some or all of the channels are plugged, is should be understood that, in alternative embodiments, all the channels of the porous ceramic honeycomb article may be unplugged, such as when the porous ceramic honeycomb article is used as catalytic through-flow substrate.

In the embodiment described herein the porous ceramic honeycomb articles may have a porosity % $P \geq 45\%$ or even $\geq 47\%$. In some embodiments the porosity may be $\geq 48\%$, or even $\geq 50\%$. In other embodiments the porosity may be $\geq 52\%$, or even $\geq 54\%$. In still other embodiments the porosity may be $\geq 55\%$, or even $\geq 58\%$. In other embodiments the porosity may be $\geq 60\%$.

As briefly discussed above, cordierite porous ceramic honeycomb articles have a relatively high CTE over the temperature range from about 25° C. to 800° C. and a corresponding low resistance to thermal shock in an as-fired condition. However, following washcoating and calcining and/or a thermal treatment, the porous ceramic honeycomb articles described herein have a relatively lower CTE over the temperature range from about 25° C. to 800° C. and, as a result, an improved resistance to thermal shock. CTE, as used herein, is the coefficient of thermal expansion along a direction of the article parallel to the lengths of the channels over the specified temperature range, unless otherwise specified. The improvement in the CTE and the corresponding improvement in thermal shock resistance following washcoating and calcining and/or a thermal treatment is due to the increase in the volume of microcracks indicated by an increase in the microcrack parameter $Nb^3$ which is an indirect measure of the extent of microcracking in the article.

The microcrack parameter $Nb^3$ is derived from the modulus of elasticity (E) heating curve to 1200° C. $Nb^3$ is calculated as:

$$Nb^3 = \frac{\left[\frac{E_0}{E} - 1\right]}{1.8},$$

where E is the elastic modulus of the article at room temperature with microcracks (i.e., after washcoating/calcining and/or thermal treatment), $E_0$ is the elastic modulus of the article at room temperature without microcracks, N is the number of microcracks per unit volume and b is the average half-length of a microcrack.

Figure 2:
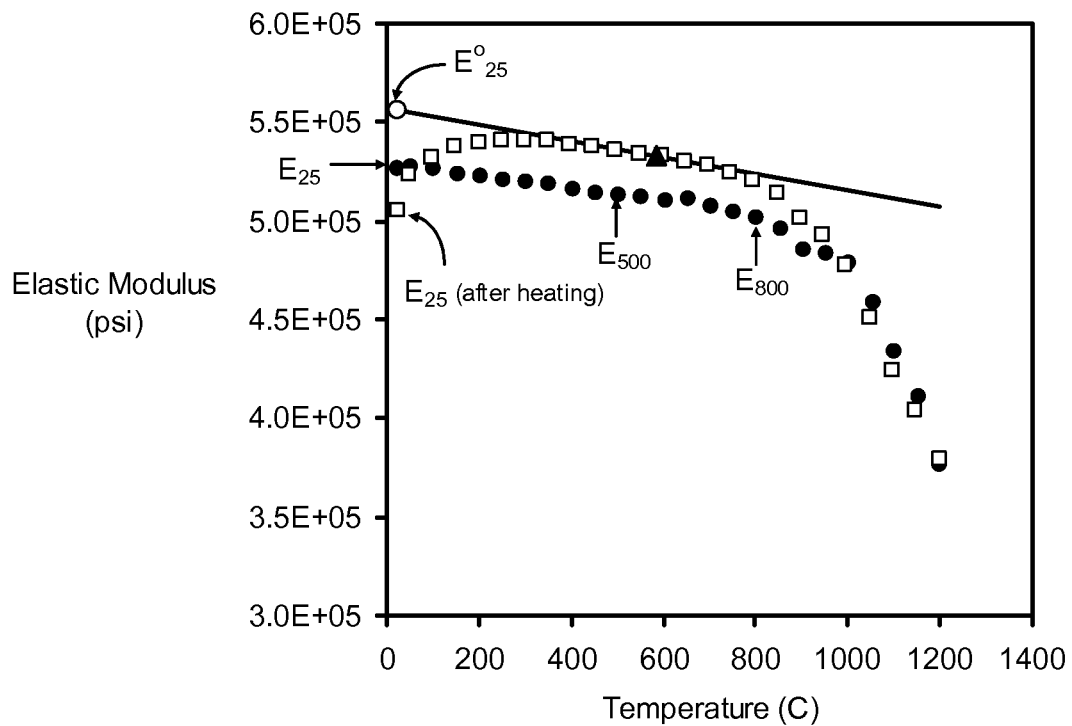
FIG. 2 graphically depicts the elastic modulus versus temperature during heating (filled circles) and cooling (open squares) of an as-fired specimen of Inventive Example 1 between room temperature and 1200° C.

A typical heating curve used to determine the microcrack parameter is graphically depicted in FIG. 2. The value $E_{25}$ denotes the elastic modulus of the article at 25° C. before heating; $E_{500}$ and $E_{800}$ denote the elastic moduli at 500° C. and 800° C. during heating, respectively. The value $E°_{25}$ denotes the elastic modulus of a hypothetically non-microcracked article calculated by extrapolation of the tangent to the cooling curve at a point indicated by the filled triangle back to room temperature. $E_{25}$ (after heating) is the elastic modulus at room temperature measured after cooling the sample from 1200° C. The lower value of $E_{25}$ after cooling relative to the initial value indicates an increase in microcracking after thermal exposure at 1200° C. The value of $E°_{25}$ and the position of tangency to the cooling curve were determined mathematically to be consistent with the requirement that the tangent has a slope $\Delta E/\Delta T$ equal to $-7.5 \times 10^{-5}$ ($E°_{25}$) in units of psi/° C. It has been experimentally determined that the rate of change in the elastic modulus of a non-microcracked cordierite ceramic with increasing temperature is related to the elastic modulus at room temperature by the equation $(\Delta E/\Delta T)/E°_{25} = -7.5 \times 10^{-5}/°$ C. This relationship is fundamental to all non-microcracked cordierite ceramics and is dictated by the intrinsic rate at which the atomic bonds in the crystalline structure of the cordierite crystals weaken with increasing temperature.

In the embodiments described herein, the porous ceramic honeycomb articles are formed from a combination of cordierite forming raw materials and glass forming raw materials such that, after firing and before exposure to a thermal treatment, the porous ceramic honeycomb article includes a primary cordierite crystalline phase comprising domains of cordierite crystallites and pockets of an intercrystalline glass phase positioned among the cordierite crystallites within the domains and between the domains of cordierite crystallites. The cordierite crystallites have a subparallel orientation with one another within each domain. The crystallite orientation within each domain differs from that of the adjacent domain.

The intercrystalline glass phase is present in the as-fired porous ceramic honeycomb article in an amount sufficient to relieve microstresses that would otherwise develop during cooling of the article due to the large size of the cordierite crystallite domains and the anisotropy in the coefficient of thermal expansion of the cordierite crystallites along different crystallographic directions. Relief of the micro stresses reduces the formation of microcracks such that the porous ceramic article has a relatively low amount of microcracking in an as-fired condition. This low amount of microcracking provides high strength to the as-fired article. In the embodiments described herein, the intercrystalline glass phase is present in the as-fired porous ceramic honeycomb article in an amount $\geq 4$ wt. % of the article. The intercrystalline glass phase typically exists as small pockets of intercrystalline glass. In one embodiment, the largest dimension of the pockets of intercrystalline glass is from about 0.5 microns to about 10.0 microns. In another embodiment, the largest dimension of the pockets of intercrystalline glass is from about 0.5 microns to about 5 microns.

Further, the microcracking of the as-fired article is sufficiently low and the intercrystalline glass phase is of a sufficiently chemically durable composition such that extensive etching of the glass phase and/or propagation of the microcracks by stress corrosion during a subsequent washcoating process does not occur to an extent that would lead to an unacceptable reduction in the strength of the porous ceramic honeycomb article. Preservation of a low degree of microcracking prior to and during washcoating minimizes the penetration of washcoat particles into the microcracks, which would reduce the thermal shock resistance of the article by increasing the coefficient of thermal expansion (CTE) and the elastic modulus (E) of the article during heating. In addition, the composition of the intercrystalline glass phase is such that the glass undergoes devitrification during exposure to a thermal treatment at temperatures at or above 800° C., thereby reducing the efficacy of the mechanism for relieving the microstresses between the cordierite crystallite domains by viscous flow of the intercrystalline glass phase.

In addition, the domain size of the cordierite crystallites described herein is sufficiently large (i.e., $\geq 40$ microns) so that, after devitrification of the intercrystalline glass phase during the thermal treatment, cooling of the article to below 100° C. results in a substantial increase in microcracking, thereby lowering the CTE and increasing the thermal shock resistance of the article.

In one embodiment, the as-fired cordierite ceramic article comprises 80 wt. % to 90 wt. % of a cordierite phase, 4 wt. % to 15 wt. % of a glass phase, 0 wt. % to 2 wt. % of a spinel phase, 0 wt. % to 4 wt. % of a sapphirine phase, 0 wt. % to 2 wt. % of a mullite phase, and $\leq 2$ wt. % of other phases. The amount of each phase is determined by Rietveld refinement of the x-ray diffraction pattern of a powdered sample of the article. The term "cordierite phase" includes the sum of the amounts of hexagonal and orthorhombic crystal forms of the predominantly $Mg_2Al_4Si_5O_{18}$ (cordierite compound). It is understood that other elements such as iron, sodium, and potassium, may substitute into the crystal structure of the cordierite phase.

In the embodiments described herein, the porous ceramic honeycomb articles exhibit an as-fired microcrack parameter $Nb^3$ of $\leq 0.06$ in an as-fired condition (i.e., after the porous ceramic honeycomb article has been fired and before the article is washcoated, calcined and/or exposed to a thermal treatment). In some embodiments, the as-fired microcrack parameter $Nb^3$ of the porous ceramic honeycomb article is $\leq 0.05$ or even $\leq 0.04$. In other embodiments, the as-fired microcrack parameter $Nb^3$ of the porous ceramic honeycomb article is $\leq 0.03$ or even $\leq 0.02$.

The porous ceramic honeycomb articles described herein also exhibit a slight increase in the microcracking parameter after the porous ceramic honeycomb articles are washcoated and calcined. The increase in the microcracking parameter is due to penetration of washcoat particles into existing microcracks and, in some instances, the development and/or propagation of new microcracks due to stress corrosion initiated by the acidic washcoat. However, this increase in the microcracking parameter is only slight because of the low extent of microcracking in the as-fired article.

In the embodiments described herein, the washcoating process entails infiltrating the channels and, optionally, the internal porosity of the channel walls of the honeycomb with a slurry of colloidal aluminum oxide hydroxide at a pH of 2.0. Thereafter, excess slurry was removed from the porous ceramic honeycomb article by blowing air down the channels and, optionally, across the thickness of the channel walls. The porous ceramic honeycomb articles were then dried and calcined at 550° C. for 4 hours. The mass of washcoat retained by the article after drying was typically between 5% and 25% by weight of the pre-coated ceramic article, more typically between 10% and 20%.

In the embodiments described herein, the porous ceramic honeycomb articles exhibit a coated microcrack parameter $Nb^3$ of $\leq 0.14$ after washcoating and calcining but before the article is exposed to a thermal treatment. In some embodiments, the coated microcrack parameter $Nb^3$ of the porous ceramic honeycomb article is $\leq 0.09$ or even $\leq 0.08$. In other embodiments, the coated microcrack parameter $Nb^3$ of the porous ceramic honeycomb article is $\leq 0.07$, $\leq 0.06$ or even $\leq 0.05$.

In the embodiments described herein, the porous ceramic honeycomb articles exhibit a significant increase in the microcracking parameter after the porous ceramic honeycomb articles are exposed to a thermal treatment cycle. This increase in the microcracking parameter is due to the devitrification and recrystallization of at least a portion of the intercrystalline glass phase during exposure to the thermal cycle. Without sufficient intercrystalline glass phase present to relieve the microstresses that develop in the cordierite crystalline domains during cooling, the domains readily undergo microcracking as the porous ceramic honeycomb article is cooled to room temperature thereby increasing the amount of microcracking in the article. In the embodiments described herein, the thermal treatment comprised two cycles of heating the article from 800° C. to 1100° C. for a total exposure of 32.5 hours between those two temperatures.

In the embodiments described herein, at least a portion of the porous ceramic honeycomb articles exhibits a first treated microcrack parameter $Nb^3$ of $\geq 0.18$ after exposure to the thermal treatment. In some embodiments, the first treated microcrack parameter $Nb^3$ of the porous ceramic honeycomb article is $\geq 0.20$ or even $\geq 0.22$. In other embodiments, the first treated microcrack parameter $Nb^3$ of the porous ceramic honeycomb article is $\geq 0.24$, $\geq 0.26$, $\geq 0.28$ or even $\geq 0.30$.

The term modulus of rupture (MOR) refers to the axial flexural strength of the porous ceramic honeycomb article. MOR is measured using a four-point method on a cellular bar cut parallel to the lengths of the channels of the porous ceramic honeycomb article. The term closed frontal area (CFA) refers to the fractional area occupied by the porous channel walls in a cross section orthogonal to the lengths of the cell channels. For a given bulk density of the porous ceramic honeycomb article, the CFA can be calculated according to the equation:

$$CFA=(bulk\ density)/\{2.51*[1-(\%P/100)]\}$$

in which the bulk density is in units of g/cm$^3$ and % P is the porosity of the porous ceramic honeycomb article. In other instances, the CFA may be calculated according to the relation:

$$CFA=(w)(N)[2(N^{-0.5})-w],$$

where w is the wall thickness of the porous ceramic honeycomb article in units of inches and N is the cell density in units of in$^{-2}$.

The value MOR/CFA is proportional to, and is approximately equal to, the strength of the ceramic comprising the wall of the porous ceramic honeycomb article. In some embodiments described herein, the value of MOR/CFA before and after washcoating and calcination (i.e., the as-fired MOR/CFA value and the coated MOR/CFA value) are $\geq 1600$ psi or even $\geq 1800$ psi. In other embodiments the as-fired MOR/CFA value and the coated MOR/CFA value are $\geq$psi 2000 or even $\geq 2200$ psi. In still other embodiments the as-fired MOR/CFA value and the coated MOR/CFA value are $\geq$psi 2400 or even $\geq 2600$ psi.

In other embodiments, the coated MOR/CFA value is $\geq 60\%$ of the as-fired MOR/CFA value. In some embodiments the coated MOR/CFA value is $\geq 70\%$ of the as-fired MOR/CFA value or even $\geq 80\%$ of the as-fired MOR/CFA value. In other embodiments the coated MOR/CFA value is $\geq 85\%$ of the as-fired MOR/CFA value or even $\geq 90\%$ of the as-fired MOR/CFA value. A high percentage of strength retention after washcoating and calcination indicates less extension of the microcracks by stress corrosion due to the interaction of water or hydronium ions from the washcoat solution with silicate bonds at the tip of any pre-existing microcracks.

Because an increase in porosity reduces the strength of the porous ceramic honeycomb article, it is useful to specify the value of MOR/CFA that is achievable as a function of the total porosity of the porous ceramic honeycomb article. It has been determined that the value of MOR/CFA for cordierite porous ceramic honeycomb articles having a given extent of microcracking is proportional to the quantity $(1-P)^{2.35}$, where "P" is defined as % porosity/100. In the embodiments described herein, the porous ceramic honeycomb articles preferably exhibit a ratio of flexural strength to closed frontal area normalized to zero porosity MOR*/CFA which is equal to $(MOR/CFA)(1-P)^{-2.35}$. In some embodiments, the porous ceramic honeycomb article exhibits an as-fired MOR*/CFA and a coated MOR*/CFA of at least 10,000 psi. In other embodiments the as-fired MOR*/CFA value and the coated MOR*/CFA value are $\geq$psi 12000 or even $\geq 14000$ psi. In still other embodiments the as-fired MOR*/CFA value and the coated MOR*/CFA value are $\geq 16000$ psi or even $\geq 18000$ psi.

The Young's elastic modulus, E, of samples of the porous ceramic honeycomb article were measured at different temperatures by a sonic resonance technique on a bar cut parallel to the lengths of the channels of the porous ceramic honeycomb article. As described above, the value $E_{25°\ C.}$ denotes the elastic modulus of the article at room temperature before heating while the value $E_{500°\ C.}$ denotes the elastic modulus of the article at 500° C. during heating. The as-fired porous ceramic honeycomb articles described herein have an as-fired $E_{500°\ C.}/E_{25°\ C.}$ ratio $\leq 0.99$ or even $\leq 0.97$. In some embodiments, the porous ceramic honeycomb articles exhibit an as-fired $E_{500°\ C.}/E_{25°\ C.}$ ratio $\leq 0.96$ or even $\leq 0.95$.

Figure 3:
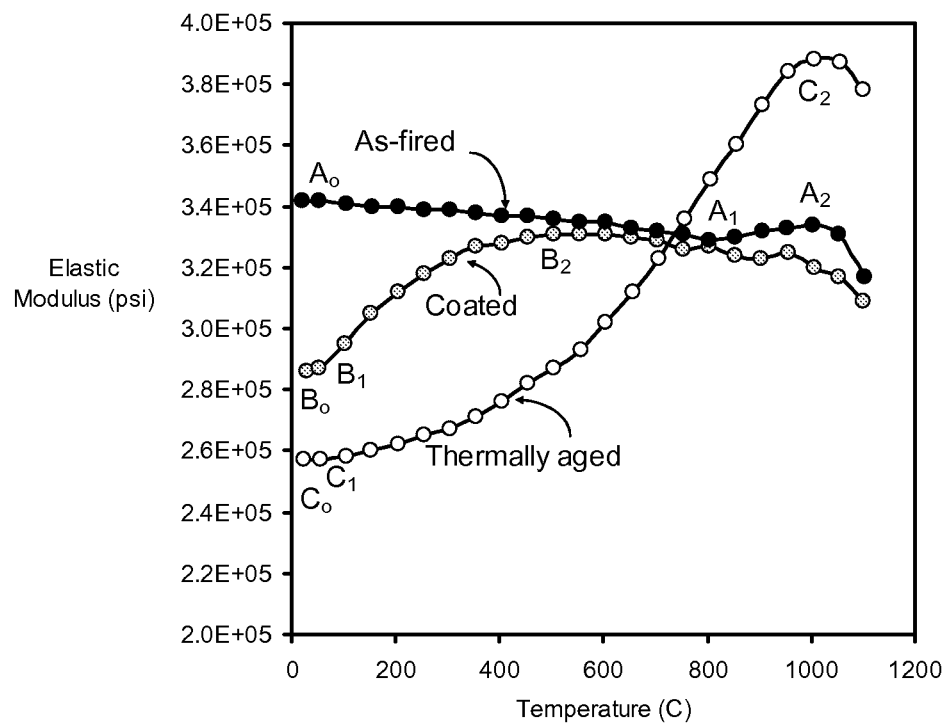
FIG. 3 graphically depicts the elastic modulus versus temperature curves during heating of a specimen of Comparative Example C4 in an as-fired state (black circles), washcoated and calcined (gray circles), and washcoated and thermally treated at 800-1100° C. for 32.5 hours (open circles)

The coated $E_{500°\ C.}/E_{25°\ C.}$ ratio of the porous ceramic honeycomb articles after washcoating and calcination has been determined to be proportional to the extent to which existing microcracks in the porous ceramic honeycomb articles have been penetrated by washcoat particles during the coating process. An example of the effect of washcoating on the elastic modulus heating curve for a non-inventive low-microcracked cordierite ceramic is depicted in FIG. 3. Specifically, FIG. 3 graphically depicts the elastic modulus versus temperature curves during heating of Comparative Example C4 in an as-fired condition (black circles), a washcoated and calcined condition (gray circles), and a washcoated/calcined and thermally treated condition at 800-1100° C. for 32.5 hours (open circles). The increase in the elastic modulus from $A_1$ to $A_2$ is due to the closing of a small number of microcracks. The decrease in the elastic modulus from $A_0$ to $B_0$ is due to extension of microcracks after washcoating. The increase in the elastic modulus from $B_1$ to $B_2$ is due to the closing of microcracks in the coated sample beginning at a very low temperature, and signifies the penetration and deposition of washcoat particles in the microcracks. The decrease in the elastic modulus from $B_0$ to $C_0$ is due to further opening of microcracks after thermal treatment at 800-1100° C. The large increase in the elastic modulus from $C_1$ to $C_2$ beginning at low temperature is due to reclosing of large increase in microcracks.

Based on the foregoing, a low value for the coated $E_{500°\ C.}/E_{25°\ C.}$ ratio indicates minimal infiltration of the microcracks with washcoat and minimal extension of the microcracks during coating. In the embodiments described herein the coated porous ceramic honeycomb articles have a coated $E_{500°\ C.}/E_{25°\ C.}$ of $\leq 1.06$. In some embodiments, the coated $E_{500°\ C.}/E_{25°\ C.}$ ratio may be $\leq 1.04$ or even $\leq 1.03$. In still other embodiments, the coated $E_{500°\ C.}/E_{25°\ C.}$ ratio is $\leq 1.02$.

To provide a high thermal shock resistance, the value of the axial coefficient of thermal expansion from 25 to 800° C. after thermal treatment of the washcoated article to two cycles between 800 and 1100° C. for a total exposure of 32.5 hours between those temperatures (i.e., the first treated mean coefficient of thermal expansion) of the porous ceramic articles described herein is $\leq 12\times 10^{-7}$° $C.^{-1}$. In some embodiments, the first treated mean CTE is $\leq 11\times 10^{-7}$° $C.^{-1}$ or even $\leq 10\times 10^{-7}$° $C.^{-1}$. In other embodiments, the first treated mean CTE is $\leq 9\times 10^{-7}$° $C.^{-1}$ and even $\leq 8\times 10^{-7}$° $C.^{-1}$. A low value of the first treated mean CTE indicates adequate microcracking after thermal exposure which, in turn, provides a high thermal shock resistance for elevated temperature applications such as exhaust after-treatment applications. The coefficient of thermal expansion is measured by dilatometry in a direction parallel to the lengths of the honeycomb channels. The value CTE from 25°-800° C. is defined as $[(L_{800°\ C.}-L_{25°\ C.})/L_{25°\ C.}]/(800-25°\ C.)$ where $L_i$ is the length of the ceramic specimen at temperature "i."

The porous ceramic bodies described herein may be produced by mixing together cordierite-forming raw materials and glass-forming raw materials with at least one ceramic processing aid (such as an organic binder, lubricants and the like), adding water and mixing to form a plasticized batch mixture. The plasticized batch mixture is then extruded to form a green honeycomb article. The green honeycomb article is then dried and fired to a temperature sufficient to react the raw materials to form a cordierite crystalline phase and an intercrystalline liquid phase, and cooling the body to yield a cordierite ceramic containing a residual intercrystalline glass phase. The cordierite crystalline phase of the cordierite ceramic has a stoichiometry which approximates $Mg_2Al_4Si_5O_{18}$.

In some embodiments, the cordierite-forming raw materials are selected from talc, calcined talc, chlorite, calcined chlorite, kaolin, calcined kaolin, an aluminum oxide-forming source, and crystalline or non-crystalline silica. In other embodiments, the cordierite-forming raw materials are selected from talc or calcined talc, spinel, or a magnesium oxide-forming source; an aluminum oxide-forming source; and crystalline or non-crystalline silica. An aluminum oxide-forming source is a substance which, when heated in air to temperatures above about 1000° C., forms >95% pure aluminum oxide. Examples of aluminum oxide-forming sources include, for example, corundum, gamma-alumina, bayerite, gibbsite, boehmite, and the like. A magnesium oxide-forming source is a substance which, when heated in air to temperatures above 1000° C., forms >95% pure magnesium oxide. A non-limiting, representative list of suitable cordierite forming components and their corresponding weight percentages in inventive compositions is shown in Table 3. In general, the cordierite batch compositions comprise from about 35% to about 45% by weight of talc; from about from about 24% to about 35% by weight of an aluminum oxide-forming source; from about 0% to about 20% by weight of kaolin; and from about 13% to about 25% by weight of a silica powder source.

In some embodiments, the raw materials selected to form the cordierite ceramic by reaction sintering are absent of: (1) pre-reacted cordierite powder; (2) magnesium aluminosilicate glass powder; (3) a combination of magnesium aluminate spinel and a kaolin or calcined kaolin; (4) a magnesium oxide-forming source, such as MgO, $Mg(OH)_2$, $MgCO_3$, etc., and a kaolin or calcined kaolin in order to provide sufficiently large cordierite crystallite domains in the fired porous ceramic honeycomb article. In some embodiments the cordierite raw materials are also absent of particulate mullite, kyanite, or sillimanite.

Additional pore-forming agents, such as organic particles, may be added to the raw material mixture to increase the amount of porosity in the fired article. A non-limiting, representative list of suitable pore-forming agents and their corresponding weight percentages is shown in Table 3 and include, without limitation, graphite, walnut shell flour and wheat starch. In the embodiments described herein the batch mixture may comprise from about 10% by weight to about 50% by weight of the pore-forming agents.

In addition to the cordierite-forming raw materials, the batch mixture also contains one or more glass-forming raw materials. In some embodiments described herein, the glass-forming raw materials are suitable to produce a magnesium aluminosilicate glass phase in the as-fired porous ceramic honeycomb article. By way of example and not limitation, the glass-forming raw materials may include powders that contain substantial amounts of other metal oxide components such as yttrium oxide, lanthanum oxide or other rare earth oxides, calcium oxide, or potassium oxide in order to form a sufficient amount of glass in the fired article to suppress microcracking prior to exposing the porous ceramic honeycomb article to a thermal treatment above 800° C. A non-limiting, representative list of suitable glass-forming raw materials and their corresponding weight percentages in inventive compositions is shown in Table 3. By way of example and not limitation, these glass forming raw materials may include yttrium oxide powder, lanthanum oxide powder, alkali feldspar, bentonite, and attapulgite.

When one or more of yttrium oxide powder, lanthanum oxide powder, alkali feldspar, bentonite, and attapulgite are added to the raw material mixture, it has been found that the coated MOR*/CFA value for the coated and calcined parts is well described by the equation:

coated MOR*/CFA=$2134+S_B$, where $S_B=9300Y_{LaP}+13400Y_{YP}+6000Y_{FP}+2400Y_{BP}+1000Y_{AP}$; and $Y_{LaP}$ is a weight percent of lanthanum oxide powder in the batch mixture, $Y_{YP}$ is a weight percent of yttrium oxide powder in the batch mixture, $Y_{FP}$ is a weight percent of alkali feldspar powder in the batch mixture, $Y_{BP}$ is a weight percent of bentonite powder in the batch mixture, $Y_{AP}$ is a weight percent of attapulgite powder in the batch mixture.

In one embodiment described herein, the amounts of yttrium oxide, lanthanum oxide, alkali feldspar, bentonite, and attapulgite present in the batch mixture are such that $S_B \geq 8000$ to ensure that the coated MOR*/CFA value of the coated and calcined porous ceramic honeycomb article is at least 10,000 psi. In other embodiments, the amounts of yttrium oxide, lanthanum oxide, alkali feldspar, bentonite, and attapulgite are such that the value of $S_B \geq 10000$ or even $\geq 12000$. In yet other embodiments, the amounts of yttrium oxide, lanthanum oxide, alkali feldspar, bentonite, and attapulgite in the batch mixture are such that the value of $S_B \geq 14000$ or even $\geq 16000$.

It should be understood that the use of powders of yttrium oxide, lanthanum oxide, alkali feldspar, bentonite, and attapulgite are non-limiting examples of vehicles through which yttrium, lanthanum, calcium, and potassium may be introduced into the batch mixture so as to provide an intercrystalline glass phase in the as-fired porous ceramic honeycomb article which suppresses microcracking in the as-fired article and in the article after washcoating, catalyzing, and calcining, and also such that the intercrystalline glass phase undergoes devitrification so as to enable formation of microcracks after thermal treatment above 800° C. It should also be understood that yttrium, lanthanum, calcium, and potassium may also be introduced into the batch mixture in other forms, including, without limitation, the carbonates, sulfates, hydroxides, silicates, aluminosilicates, or other compounds of these elements. Alternatively, the metal oxides of such materials may be provided as water-soluble compounds which are added as powders or as aqueous solutions to the batch mixture. The addition of these glass-forming components may not be required when one or more of the cordierite-forming raw materials contain a sufficient amount of the glass-forming components as a constituent to provide the necessary amount of glass in the fired porous ceramic honeycomb article.

As described above, cordierite-forming raw materials and glass-forming raw materials are combined and mixed together with processing aids such as, for example, a binder and a liquid vehicle, to create a plasticized batch mixture. These processing aids may improve processing and/or reduce drying and/or firing cracking and/or aid in producing desirable properties in the honeycomb article. For example, the binder can include an organic binder. Suitable organic binders include water soluble cellulose ether binders such as methylcellulose, hydroxypropyl methylcellulose, methylcellulose derivatives, hydroxyethyl acrylate, polyvinylalcohol, and/or any combinations thereof. In addition to the liquid vehicle and binder, the plasticized batch composition may include one or more optional forming or processing aid such as, for example, a lubricant. Exemplary lubricants can include tall oil, sodium stearate or other suitable lubricants.

After the plasticized batch mixture is extruded to form a green honeycomb article, the green honeycomb article is dried and then fired at 1415° C. to 1426° C. and cooled to room temperature, conditions which are sufficient to form a primary cordierite phase from the inorganic cordierite raw materials and, in some examples, an intercrystalline glass phase. The heating rates through specific portions of the firing cycle, maximum firing temperature, and hold time at maximum temperature are shown for the examples in Tables 5 to 8.

After firing, the intercrystalline glass phase is present in an amount $\geq 4$ wt % of the solid portion of the porous ceramic honeycomb article. In some embodiments, the intercrystalline glass phase may be present in an amount $\geq 5$ wt % or even $\geq 6$ wt % of the porous ceramic honeycomb article. In other embodiments, the intercrystalline glass phase may be present in an amount $\geq 7$ wt % or even $\geq 8$ wt % of the porous ceramic honeycomb article. In still other embodiments, the intercrystalline glass phase may be present in an amount $\geq 9$ wt % or even $\geq 10$ wt % of the porous ceramic honeycomb article. An increase of the wt % of the intercrystalline glass phase generally reduces the amount of microcracking which occurs in the porous ceramic honeycomb article upon cooling after firing and during washcoating and calcining.

The weight percent of the intercrystalline glass phase in the porous ceramic honeycomb article can be determined by Rietveld refinement of x-ray diffraction measurements on a powdered sample from the fired ceramic article, or can be determined by (1) selecting a metal oxide which is present as a minor or trace constituent in the porous ceramic honeycomb article and which is strongly partitioned into the intercrystalline glass phase in preference to the cordierite phase or other crystalline phases, (2) measuring the weight percent of that metal oxide in the bulk ceramic specimen such as by x-ray fluorescence or inductively coupled plasma, (3) measuring the weight percent of that metal oxide in the intercrystalline glass phase such as by electron probe microanalysis, and (4) computing the weight percent of glass according to the following mass balance relation:

weight % glass=100 (weight percent metal oxide in bulk ceramic)/(weight percent of metal oxide in intercrystalline glass phase)

The metal oxides which may be used in this method include calcium oxide and phosphorus oxide, yttrium oxide, lanthanum oxide, or other rare earth oxide. In cases where the intercrystalline glass phase is separated into two immiscible glass phases within a single pocket of glass during firing or cooling to room temperature after firing, chemical analysis of the intercrystalline glass phases includes a representative mixture of the two immiscible glass phases.

In the embodiments described herein, the intercrystalline glass phase is present in the porous ceramic honeycomb article in an amount $\geq 4$ vol. % of the porous ceramic honeycomb article. In some embodiments, the intercrystalline glass phase may be present in an amount $\geq 5$ vol. % or even $\geq 6$ vol. % of the porous ceramic honeycomb article. In other embodiments, the intercrystalline glass phase may be present in an amount $\geq 7$ vol. % or even $\geq 8$ vol. % of the porous ceramic honeycomb article. In still other embodiments, the intercrystalline glass phase may be present in an amount $\geq 9$ vol. % or even $\geq 10$ vol. % of the porous ceramic honeycomb article where vol. % equals the volume percent of the solid material comprising the porous ceramic honeycomb article, excluding porosity. The volume percent of glass phase is determined from the equation volume % glass=$100[(wt\ \%\ glass)/(\rho_g)]/\{[(wt\ \%\ glass)/(\rho_g)]+[(100-wt\ \%\ glass)/2.51]\}$ in which the wt. % glass is derived from wt. % glass equation described above or by Rietveld refinement of x-ray diffraction measurements of the sample and $\rho_g$ is the density of the glass in units of g/cm³. The density of the glass may be estimated from the composition of the glass using the model presented in Fluegel, A. (2007) "Global Model for Calculating Room-Temperature Glass Density from the Composition," J. Am. Cer. Soc., Vol. 90, No. 8, pp. 2622-2625.

As noted herein, the glass-forming raw materials may include yttrium oxide, lanthanum oxide or other rare earth oxides, calcium oxide, potassium oxide or various combinations thereof. An analysis of the coated MOR*/CFA values for the coated and calcined porous ceramic honeycomb articles indicates that the coated MOR*/CFA value may be related to the wt. % of the glass-forming raw materials in the porous ceramic honeycomb according to the equation:

coated MOR*/CFA=−1415+$S_F$, wherein $S_F = 9200 X_{La} + 1300 X_Y + 50000 X_K + 36200 X_{Ca}$; and $X_{La}$ is a weight percent of lanthanum oxide in the porous ceramic honeycomb article, $X_Y$ is a weight percent of yttrium oxide in the porous ceramic honeycomb article, $X_K$ is a weight percent of potassium oxide in the porous ceramic honeycomb article, $X_{Ca}$ is a weight percent of calcium oxide in the porous ceramic honeycomb article. The phrase "in the porous ceramic honeycomb" means the measured concentration of the respective metal oxide in the bulk ceramic. In the embodiments of the porous ceramic honeycomb articles described herein, the value of $S_F$ is ≥12000 to ensure that the coated MOR*/CFA value is at least 10000 psi. In other embodiments the amounts of yttrium oxide, lanthanum oxide, calcium oxide, and potassium oxide present in the as-fired porous ceramic honeycomb article are such that the value of $S_F$≥14000 or even ≥16000. In yet other embodiments, the amounts of yttrium oxide, lanthanum oxide, calcium oxide, and potassium oxide present in the as-fired porous ceramic honeycomb article are such that the value of $S_F$≥18000 or even ≥19000.

After firing, the porous ceramic honeycomb articles described herein also comprise domains of cordierite crystallites having a subparallel crystallographic orientation in common with one another within a domain, but having a different crystallographic orientation from the crystallites within adjacent domains. The orientation of the cordierite crystallite domains may be observed by examination of a petrographic thin section of the ceramic using a petrographic microscope. Specifically, a thin section of the ceramic is prepared by first impregnating the channels of the porous ceramic honeycomb article and ceramic pores with an epoxy, allowing the epoxy to harden, and grinding a face of the specimen parallel to the plane of the honeycomb wall to expose the ceramic wall at the ground surface. This ground surface is then mounted with epoxy to a glass microscope slide and the specimen is ground and polished down to 30 microns in thickness so that light can be transmitted through the remaining thickness of the ceramic wall. The petrographic microscope includes a polarizing filter situated below the sample in the light path, a second polarizer filter ("analyzer") above the sample in the light path, and a full-wave retardation plate inserted into the light path between the filters. Due to the optical anisotropy of the cordierite crystallites (different refractive indices along different crystallographic directions), the interference colors produced by the birefringence of the cordierite crystallites comprising the domains under cross-polarized light will usually appear either as blue or as yellow, depending upon the crystallographic orientation of the crystallites within the domain with respect to the polarizing direction of the filter. The size of these optical domains is proportional to the size of the crystallographic domains comprising the ceramic. A "domain length parameter" is derived by digitizing the four images of each thin section taken at 100× magnification under cross polars and applying stereological principles to the image entailing the construction of ten horizontal lines across the image and measuring the lengths of the line segments where the lines overlaps a domain. The domain length parameter is the average of the lengths of these line segments, and, although different from the actual width of the three-dimensional domain, is proportional to the true domain width and is therefore useful as a relative measure of domain size.

In the embodiments of the porous ceramic honeycomb articles described herein, the domain length parameter of the cordierite crystallite domains measured by this technique are generally ≥40 microns. In some embodiments, the domain length parameter of the cordierite crystallite domains is ≥45 microns or even ≥50 microns. In other embodiments, the domain length parameter of the cordierite crystallite domains is ≥55 microns or even ≥60 microns. Large domains are beneficial in contributing to greater microcracking and increased thermal shock resistance after devitrification of the glass phase above 800° C. By way of example and not limitation, the porous ceramic honeycomb articles made utilizing the batch mixtures of Inventive Example 7 of the "Examples" section below, had domain length parameters which were determined to be on the order of 49 microns. However, porous ceramic honeycomb articles made utilizing the batch mixtures of Comparative Example 6 had domain length parameters which were determined to be on the order of 36 microns which, in turn, contributed to lower microcracking following thermal treatment.

As noted above, the as-fired porous ceramic honeycomb article may be washcoated with a catalyst washcoat to enable a catalytic function for either a particulate filter or a flow-through substrate. In the embodiment described herein, the as-fired porous ceramic honeycomb articles are washcoated with a catalyst washcoat comprising alumina or an alumina-forming source. However, it should be understood that, in other embodiments, the porous ceramic honeycomb article may be washcoated with different catalyst washcoats containing different catalyst components and/or combinations of catalyst components. For example, in some embodiments, the catalyst component may be a zeolite, platinum or any other suitable catalyst component.

In still other embodiments, the porous ceramic honeycomb article may not be washcoated or calcined. In such embodiments, the as-fired porous ceramic honeycomb article may be exposed to the thermal treatment in the as-fired condition in order to microcrack the article.

In the embodiments described herein, the CTE of the as-fired porous ceramic article may be decreased and the thermal shock resistance of the article improved by exposing the article to a thermal treatment at a thermal treatment temperature which is greater than the devitrification temperature of the intercrystalline glass phase. The devitrification temperature of the intercrystalline glass phase is a temperature at which the glass undergoes at least a partial degree of devitrification. In the embodiments described herein, the glass phase generally has a devitrification temperature of ≥800°. The thermal treatment may be applied to the porous ceramic honeycomb article prior to use in an exhaust treatment application. As described above, the thermal treatment comprises exposing at least a portion of the porous ceramic article to temperatures in excess of 800° C. which, in turn, causes the intercrystalline glass phase to partially or completely devitrify and recrystallize. In some embodiments described herein, the thermal treatment comprises cycling the porous ceramic article from 800° C. to 1000° C. for at least two cycles such that the porous ceramic article remains between these temperatures in excess of 32.5 hours. Thereafter, the porous ceramic article is cooled to room temperature. As the article is cooled, microstresses develop in the cordierite domains. Without sufficient intercrystalline glass phase present to absorb these microstresses, the cordierite domains undergo microcracking which, in turn, lowers the CTE of the porous ceramic honeycomb article and improves the thermal shock resistance of the article.

Referring now to FIG. 13, in one embodiment, the thermal treatment comprises exposing a first portion 150 of the porous ceramic honeycomb article 100 to a temperature and time sufficient to produce an increase in microcracking and a decrease in CTE while a second portion 152 of the porous ceramic article is maintained at a sufficiently low temperature to preserve a high-strength, low-microcracked state. For example, in one embodiment, the first portion 150 of the porous ceramic honeycomb article 100 comprises a cylindrical, conical, paraboloidal, or other shaped region within the interior of the porous ceramic honeycomb article 100. The region extends from the central axis 154 of the porous ceramic honeycomb article 100 to a radius $R_1$, wherein the radius $R_1$ is at least 50% of the maximum radius $R_{Max}$ of the porous ceramic honeycomb article 100. The second portion 152 of the porous ceramic honeycomb article 100 comprises the remaining portion of the article including the external skin and peripheral channels. In one embodiment, the thermal treatment of the first portion 150 of the porous ceramic honeycomb article 100 is performed by flowing a heated gas through the first portion 150 of the porous ceramic honeycomb article 100 at a temperature and for a time sufficient to promote devitrification of the intercrystalline glass phase and increase the extent of microcracking in the interior of the article. The heated gas generally has a temperature which is greater than the devitrification temperature of the intercrystalline glass phase. Following treatment, the first portion 150 of the porous ceramic honeycomb article 100 has a first microcrack parameter $Nb^3$, as described above, and is encircled by the second portion 152 which has a second treated microcrack parameter $Nb^3$ which is less than the first microcrack parameter $Nb^3$. Accordingly, the first portion 150 of the porous ceramic honeycomb article 100 has an increase in microcracking and a decrease in CTE while the high strength and low microcracked state of the second portion 152 are preserved.

While FIG. 13 depicts thermally treating a first portion 150 of the porous ceramic honeycomb article 100 such that distinct portions of the porous ceramic honeycomb article 100 have different characteristics, it should be understood that the thermal treatment may be applied to the entire porous ceramic honeycomb article such that the entire article has the same characteristics after the thermal treatment.

It should now be understood that the porous ceramic honeycomb articles described herein provide a high-strength, low-microcracked as-fired ceramic honeycomb body which preserves its high strength and low elastic modulus after washcoating, catalyzing, and calcining, without the need for a passivation step, while also allowing for an increase in microcracking during exposure to high temperatures such that the thermal shock resistance of the ceramic body is increased during use.

Moreover, the implementation of a thermally induced microcracked material after washcoating and calcination eliminates the need for the materials and processing time required for pre-washcoat passivation of the microcracks in the as-fired porous ceramic honeycomb article. In addition, the porous ceramic honeycomb articles described herein can be readily implemented into standard coating processes since they requires no process changes at the catalyzer.

Further, it has been postulated that the failure mode of a microcracked body could be preferred over that of a non-microcracked body due to the ability of the microcracks to provide a toughening mechanism. More specifically, experiments show that a common failure mode for diesel particulate filters under thermal stress from a regeneration event is a crack originating at the periphery of the part and propagating inward, roughly parallel to the inlet and outlet faces. If the crack runs completely through the porous ceramic honeycomb article separating the article into two sections, it is termed a ring-off crack. If the crack only extends inward only partway, then the crack is termed a rim crack. It has been found that ring-off cracks result in a step change increase in soot leakage from the porous ceramic article, whereas rim cracks do not result in a change in filtration efficiency. For this reason, the rim crack is not regarded as a filter failure, but the ring-off crack is. It has been observed that more highly microcracked cordierite ceramics survive higher temperatures and larger thermal gradients before undergoing ring-off cracking than cordierite ceramics that remain largely non-microcracked even after exposure to elevated temperatures.

Examples

The embodiments described herein will be further clarified by the following examples.

Raw materials used to make the inventive and comparative examples described herein are listed in Table 1, along with the values of $D_{10}$, $D_{50}$, and $D_{90}$ of their particle size distribution, as measured by Microtrac. The quantity $D_{50}$, as used herein, refers to the median particle size of the particles in the particle size distribution. The quantity $D_{10}$, as used herein, is the particle diameter at which 10% of the particle size distribution is comprised of particles whose diameters are smaller than the value of $D_{10}$. Similarly, the quantity $D_{90}$, as used herein, is the particle diameter at which 90% of the particle size distribution is comprised of particles whose diameters are smaller than the value of $D_{90}$. Chemical compositions of the raw materials are provided in Table 2. The raw material mixtures of Table 3 are indicative of Inventive Examples while Table 4 contains the raw material mixtures for Comparative Examples. Also provided in Tables 3 and 4 are the calculated estimates of the compositions of the as-fired porous ceramic honeycomb articles made from the respective raw material mixtures as computed from the compositions of the raw materials in Table 2. The porous ceramic articles made according to the Inventive Examples were expected to have domain length parameters ≥40 microns.

TABLE 1

Raw materials used in the examples

| Raw Material | Supplier | Product Code | $D_{10}$ (microns) | $D_{50}$ (microns) | $D_{90}$ (microns) |
| --- | --- | --- | --- | --- | --- |
| Talc A | Luzenac | Jetfil 500 | 4.4 | 9.7 | 19 |
| Talc B | Barretts Minerals | 93-37 | 3.4 | 8.5 | 18.1 |
| Talc C | Barretts Minerals | 96-67 | 5.3 | 15.8 | 36.5 |
| Talc D | Luzenac | FCOR | 9.4 | 23.9 | 46.7 |
| Spinel | CE Minerals | Spinel 25 (milled) | 1.5 | 6.7 | 14.2 |
| Alumina A | Almatis, Inc. | A3000 | 0.7 | 3.3 | 7.7 |
| Alumina B | Almatis, Inc. | HVA | 3.3 | 6.6 | 19.7 |
| Aluminum Hydroxide | J. M. Huber Corporation | Micral 6000 | 1.8 | 5.2 | 10.8 |
| Boehmite | Sasol North America Inc. | Dispal 18N4-80 | 0.05 | 0.13 | 0.36 |
| Kaolin A | Engelhard Corporation | CSG-04 | 0.9 | 3.3 | 8.0 |

TABLE 1-continued

Raw materials used in the examples

| Raw Material | Supplier | Product Code | $D_{10}$ (microns) | $D_{50}$ (microns) | $D_{90}$ (microns) |
|---|---|---|---|---|---|
| Kaolin B | Engelhard Corporation | CHC-94 | 2.4 | 7.3 | 17.2 |
| Quartz | Unimin Specialty Minerals, Inc. | Imsil A25 | 1.1 | 4.5 | 17.5 |
| Lanthanum Oxide | Molycorp, Inc. | 5205 | 3.2 | 8.7 | 20.0 |
| Yttrium Oxide | H. C. Starck, GmbH | Grade C | 0.4 | 1.1 | 5.0 |
| Feldspar | Feldspar Corporation/Zemex Industrial Minerals Inc. | G-200 HP | 3.9 | 18.8 | 53.6 |
| Strontium Carbonate | Chemical Products Corporation | Type W | 1.7 | 6.3 | 13.1 |
| Attapulgite | Active Minerals Co. LLC | Acti-Gel ® 208 | 5.8 | 14.7* | 30.2 |
| Bentonite | Wyo-Ben, Inc. | Big Horn CH 325 −20 μm | 0.8 | 2.6 | 14.4 |
| Graphite A | Asbury Carbons | 4014, −280 mesh | 3.5 | 8.3 | 16.6 |
| Graphite B | Asbury Carbons | 4602, 4566 | 10.5 | 36.4 | 71.1 |
| Graphite C | Asbury Carbons | 4566, +30 μm | 28.4 | 56.2 | 97.7 |
| Walnut Shell Flour A | Eco-Shell, Inc. | −325 | 4.7 | 26.8 | 70.1 |
| Walnut Shell Flour B | Eco-Shell, Inc. | −200 | 9.4 | 28.9 | 62.9 |
| Walnut Shell Flour C | Eco-Shell, Inc. | +30 μm | 23.1 | 42.3 | 78.1 |
| Cross-Linked Wheat Starch A | MGP Ingredients, Inc. | Fibersym RW | 11.2 | 19.2 | 30.1 |
| Cross-Linked Wheat Starch B | MGP Ingredients, Inc. | Fibersym RW, +20 μm | 14.3 | 22.1 | 33.9 |
| Methyl Cellulose | The Dow Chemical Co. | METHOCEL ™ F240 | — | — | — |
| Hydrogenated Dimeric 1-Decene | Innovene USA LLC | Durasyn ® 162 | — | — | — |
| Stearic Acid | Cognis Corp. | Emersol 120 | — | — | — |
| Sodium Stearate | Witco Corp. | — | — | — | — |
| Tall Oil Fatty Acid | S and S Chemical Co. | L-5 | — | — | — |

*Flocculated particles

TABLE 2

Raw material compositions in terms of weight percentages of the metal oxides

| | MgO | $Al_2O_3$ | $SiO_2$ | $Fe_2O_3$ | $TiO_2$ | $Na_2O$ | $K_2O$ | CaO | NiO | $Cr_2O_3$ | $P_2O_5$ | LOI at 1000° C. |
|---|---|---|---|---|---|---|---|---|---|---|---|---|
| Talc A | 30.14 | 0.19 | 60.60 | 2.32 | 0.00 | 0.010 | 0.00 | 0.120 | 0.48 | 0.00 | 0.00 | 5.4 |
| Talc B | 31.05 | 1.02 | 61.49 | 1.08 | 0.06 | 0.040 | 0.00 | 0.160 | 0.00 | 0.00 | 0.00 | 5.1 |
| Talc C | 31.31 | 0.85 | 60.60 | 1.02 | 0.05 | 0.040 | 0.00 | 0.160 | 0.00 | 0.00 | 0.00 | 5.3 |
| Talc D | 30.13 | 0.19 | 59.40 | 2.55 | 0.00 | 0.010 | 0.00 | 0.230 | 0.45 | 0.00 | 0.00 | 6.3 |
| Spinel | 22.60 | 76.10 | 0.31 | 0.13 | 0.00 | 0.210 | 0.00 | 0.320 | 0.00 | 0.00 | 0.00 | 0.0 |
| Alumina A | 0.00 | 99.87 | 0.015 | 0.011 | 0.00 | 0.067 | 0.005 | 0.029 | 0.00 | 0.00 | 0.00 | 0.0 |
| Alumina B | 0.00 | 99.90 | 0.008 | 0.014 | 0.00 | 0.067 | 0.005 | 0.010 | 0.00 | 0.00 | 0.00 | 0.0 |
| Aluminum Hydroxide | 0.002 | 64.90 | 0.006 | 0.005 | 0.00 | 0.202 | 0.001 | 0.024 | 0.00 | 0.00 | 0.00 | 34.8 |
| Boehmite | 0.00 | 79.99 | 0.00 | 0.00 | 0.00 | 0.004 | 0.005 | 0.000 | 0.00 | 0.00 | 0.00 | 20.0 |
| Kaolin A | 0.06 | 37.80 | 44.40 | 0.49 | 1.14 | 0.090 | 0.070 | 0.030 | 0.00 | 0.00 | 0.00 | 14.6 |
| Kaolin B | 0.07 | 38.18 | 45.10 | 0.21 | 0.99 | 0.070 | 0.040 | 0.050 | 0.00 | 0.00 | 0.05 | 14.2 |
| Quartz | 0.008 | 0.260 | 99.52 | 0.047 | 0.018 | 0.076 | 0.042 | 0.009 | 0.00 | 0.00 | 0.019 | 0.0 |
| Feldspar | 0.00 | 18.96 | 66.40 | 0.08 | 0.00 | 2.98 | 10.54 | 0.64 | 0.00 | 0.00 | 0.00 | 0.0 |
| Attapulgite | 10.47 | 9.57 | 50.90 | 2.97 | 0.35 | 0.58 | 0.58 | 2.20 | 0.00 | 0.00 | — | 21.5 |
| Bentonite | 2.12 | 15.62 | 70.00 | 4.00 | 0.16 | 2.21 | 0.40 | 1.38 | 0.00 | 0.00 | 0.08 | 11.2 |
| Graphite B | 0.000 | 0.047 | 0.092 | 0.500 | 0.019 | 0.000 | 0.000 | 0.025 | 0.00 | 0.00 | 0.00 | 99.3 |
| Walnut Shell Flour | 0.040 | 0.00 | 0.015 | 0.00 | 0.00 | 0.002 | 0.002 | 0.154 | 0.00 | 0.00 | 0.032 | 99.8 |
| Wheat Starch | 0.009 | 0.00 | 0.004 | 0.00 | 0.00 | 0.256 | 0.007 | 0.018 | 0.00 | 0.00 | 0.596 | 98.7 |
| Sodium Stearate | 0.00 | 0.00 | 0.00 | 0.00 | 0.00 | 10.08 | 0.00 | 0.00 | 0.00 | 0.00 | 0.00 | 89.9 |

TABLE 3

Parts by weight of raw materials used in the inventive examples, and estimated compositions of the fired ceramic bodies

| | Inventive Example | | | | | | |
|---|---|---|---|---|---|---|---|
| | 1 | 2 | 3 | 4 | 5 | 6 | 7 |
| 93-37 Talc | 41.54 | — | 41.54 | 41.54 | — | 41.54 | — |
| 96-67 Talc | — | 38.98 | — | — | 41.35 | — | — |
| Jetfil 500 Talc | — | — | — | — | — | — | 42.38 |
| HVA-FG Alumina | 27.93 | 14.19 | 27.93 | 27.93 | 26.46 | 27.93 | 30.12 |
| Micral 6000 Al(OH)$_3$ | — | 16.00 | — | — | — | — | — |

TABLE 3-continued

Parts by weight of raw materials used in the inventive examples, and estimated compositions of the fired ceramic bodies

| | Inventive Example | | | | | | |
|---|---|---|---|---|---|---|---|
| | 1 | 2 | 3 | 4 | 5 | 6 | 7 |
| Dispal 18N4-80 Boehmite | — | — | — | — | — | — | 5.00 |
| CSG-04 Kaolin | 13.85 | — | 13.85 | 13.85 | — | 13.85 | — |
| CHC-94 Kaolin | — | 16.00 | — | — | 16.00 | — | — |
| Imsil A25 Quartz | 16.59 | 14.83 | 16.59 | 16.59 | 16.18 | 16.59 | 23.50 |
| Bentonite | — | 1.00 | — | — | 1.00 | — | — |
| Attapulgite | — | — | — | — | — | — | 5.00 |
| $La_2O_3$ | 1.00 | 1.00 | 1.00 | 1.00 | — | — | — |
| $Y_2O_3$ | — | — | — | — | 1.00 | 1.00 | 1.00 |
| Feldspar | 1.00 | 1.00 | — | 1.00 | — | — | — |
| 4602/4566 Graphite | — | 15.00 | — | 20.00 | 20.00 | 10.00 | — |
| Walnut Shell Flour −325 | — | — | — | — | — | — | 40.00 |
| XL Wheat Starch | 25.00 | 20.00 | — | 25.00 | 30.00 | 25.00 | — |
| XL Wheat Starch +20 μm | — | — | 20.00 | — | — | — | — |
| Methocel (A4M or F240) | 6.00 | 6.00 | 6.00 | 6.00 | 6.00 | 6.00 | 6.00 |
| Liga sodium stearate | 1.00 | 1.00 | 1.00 | 1.00 | 1.00 | 1.00 | 1.00 |
| MgO | 13.17 | 13.20 | 13.31 | 13.15 | 13.35 | 13.29 | 13.08 |
| $Al_2O_3$ | 34.53 | 33.72 | 34.71 | 34.50 | 33.89 | 34.67 | 33.89 |
| $SiO_2$ | 49.92 | 50.50 | 49.77 | 49.87 | 50.32 | 49.72 | 50.08 |
| $Fe_2O_3$ | 0.54 | 0.60 | 0.54 | 0.64 | 0.62 | 0.59 | 1.22 |
| $TiO_2$ | 0.192 | 0.200 | 0.194 | 0.195 | 0.193 | 0.195 | 0.021 |
| $Na_2O$ | 0.259 | 0.305 | 0.218 | 0.259 | 0.264 | 0.231 | 0.169 |
| $K_2O$ | 0.129 | 0.134 | 0.021 | 0.129 | 0.022 | 0.021 | 0.041 |
| CaO | 0.086 | 0.114 | 0.080 | 0.091 | 0.107 | 0.083 | 0.269 |
| NiO | 0.000 | 0.000 | 0.000 | 0.000 | 0.000 | 0.000 | 0.187 |
| $P_2O_5$ | 0.156 | 0.145 | 0.127 | 0.156 | 0.200 | 0.157 | 0.017 |
| $Y_2O_3$ | 0.00 | 0.00 | 0.00 | 0.00 | 1.02 | 1.03 | 0.98 |
| $La_2O_3$ | 1.02 | 1.07 | 1.03 | 1.02 | 0.00 | 0.00 | 0.00 |
| Calculated $S_F$ | 18962 | 20708 | 13421 | 19120 | 18231 | 17462 | 24476 |
| Calculated $S_B$ | 15300 | 17700 | 9300 | 15300 | 15800 | 13400 | 18400 |

TABLE 4

Parts by weight of raw materials used in the comparative examples, and estimated compositions of the fired ceramic bodies

| | Comparative Example | | | | | | |
|---|---|---|---|---|---|---|---|
| | C1 | C2 | C3 | C4 | C5 | C6 | C7 |
| 93-37 Talc | 41.54 | 41.54 | — | — | — | — | — |
| 96-67 Talc | — | — | 41.35 | 41.35 | 23.47 | 23.47 | — |
| FCor Talc | — | — | — | — | — | — | 42.38 |
| Spinel | — | — | — | — | 25.00 | 25.00 | — |
| HVA-FG Alumina | 27.93 | 27.93 | 26.46 | 26.46 | 9.34 | 9.34 | — |
| A3000 Alumina | — | — | — | — | — | — | 30.12 |
| Dispal 18N4-80 Boehmite | — | — | — | — | — | — | 5.00 |
| CSG-04 Kaolin | 13.85 | 13.85 | 16.00 | 16.00 | — | — | — |
| CHC-94 Kaolin | — | — | — | — | 16.00 | 16.00 | — |
| Imsil A25 Quartz | 16.59 | 16.59 | 16.18 | 16.18 | 26.12 | 26.12 | 23.50 |
| Bentonite Ch 325 | — | 1.00 | — | 1.00 | 1.00 | 1.00 | 2.50 |
| Feldspar G-200 | 0.50 | — | 0.50 | — | 2.00 | 2.00 | — |
| Strontium Carbonate | — | — | — | — | — | — | 1.50 |
| 4014 Graphite −280 mesh | 10.00 | 10.00 | 10.00 | 10.00 | — | — | — |
| 4602/4566 Graphite | — | — | — | — | — | 20.00 | — |
| 4566 Graphite +30 μm | — | — | — | — | 20.00 | — | — |
| Walnut Shell Flour −200 | — | — | — | — | — | — | 40.00 |
| Walnut Shell Flour +30 μm | — | — | — | — | 40.00 | 40.00 | — |
| FiberSym Wheat Starch | 25.00 | 25.00 | 25.00 | 25.00 | — | — | — |
| F240 Methocel | 6.00 | 6.00 | 6.00 | 6.00 | 6.00 | 6.00 | 6.00 |
| Liga sodium stearate | 1.00 | 1.00 | 1.00 | 1.00 | 1.00 | 1.00 | 1.00 |
| Calculated ceramic composition (wt %) | | | | | | | |
| MgO | 13.36 | 13.33 | 13.55 | 13.51 | 13.17 | 13.17 | 12.81 |
| $Al_2O_3$ | 34.95 | 34.88 | 34.32 | 34.25 | 35.53 | 35.53 | 34.20 |
| $SiO_2$ | 50.32 | 50.42 | 50.74 | 50.83 | 49.88 | 49.88 | 50.23 |
| $Fe_2O_3$ | 0.60 | 0.64 | 0.59 | 0.63 | 0.46 | 0.46 | 1.09 |
| $TiO_2$ | 0.196 | 0.197 | 0.219 | 0.219 | 0.183 | 0.183 | 0.01 |
| $Na_2O$ | 0.247 | 0.254 | 0.251 | 0.257 | 0.283 | 0.283 | 0.20 |
| $K_2O$ | 0.076 | 0.026 | 0.077 | 0.027 | 0.235 | 0.235 | 0.02 |

TABLE 4-continued

Parts by weight of raw materials used in the comparative examples,
and estimated compositions of the fired ceramic bodies

| | Comparative Example | | | | | | |
|---|---|---|---|---|---|---|---|
| | C1 | C2 | C3 | C4 | C5 | C6 | C7 |
| CaO | 0.087 | 0.099 | 0.089 | 0.101 | 0.223 | 0.223 | 0.16 |
| NiO | 0.000 | 0.000 | 0.000 | 0.000 | 0.000 | 0.000 | 0.20 |
| $P_2O_5$ | 0.158 | 0.158 | 0.163 | 0.163 | 0.029 | 0.029 | 0.02 |
| SrO | 0.000 | 0.000 | 0.000 | 0.000 | 0.000 | 0.000 | 1.04 |
| Calculated $S_F$ | 6958 | 4885 | 7076 | 4996 | 19834 | 19834 | 7105 |
| Calculated $S_B$ | 3000 | 2400 | 3000 | 2400 | 14400 | 14400 | 6000 |

In order to form the porous ceramic honeycomb articles of the Inventive Examples and the Comparative Examples, inorganic cordierite-forming raw materials were mixed with glass-forming additives such as yttrium oxide, lanthanum oxide, strontium carbonate, bentonite, attapulgite, and alkali feldspar, together with pore-forming agents, binders, lubricants, and water to form a plasticized batch mixture. The batch mixture was then extruded into a green honeycomb article. The green honeycomb article was dried and then fired at 1415 to 1426° C. and cooled to room temperature, conditions which were sufficient to form a primary cordierite phase from the inorganic cordierite-forming raw materials and, in the Inventive Examples, an intercrystalline glass phase. The heating rates through specific portions of the firing cycle, maximum firing temperature, and hold time at the maximum temperature for each example are shown in Tables 5 to 8. Tables 5 to 8 also contain the physical properties of the as-fired porous ceramic honeycomb article and, for most examples, the physical properties of the washcoated honeycomb article after calcination as well as the physical properties of the washcoated honeycomb article after exposure to a thermal treatment. In two cases (Examples 7 and C7), the honeycomb bodies were not washcoated, in which instances property data is provided for the as-fired body and for the non-coated body after exposure to a thermal treatment at 850° C. for 82 hours or at 1100° C. for 2 hours.

For washcoating studies, the honeycomb samples were first plugged in alternate channels on either end to form wall-flow particulate filters. Washcoating of the samples was conducted by immersing the honeycomb samples in a suspension of colloidal aluminum oxide hydroxide (Nyacol AL20SD from Nyacol Nano Technologies, Inc.). The pH of the aqueous suspension was adjusted to 2.0 with nitric acid. After coating, excess slurry was blown out of the porous walls and channels, the samples were dried, and then calcined in air at 550° C. for 4 hours. Typical washcoat pick-up was approximately 15 weight percent. The washcoated samples were subsequently subjected to thermal treatment in a gas kiln with about 10% $H_2O$ according to the temperature cycle given in Table 9. Cumulative times above various temperatures are listed in Table 10.

Properties were measured as described above. I-ratio and amounts secondary crystalline phases were determined by XRD using standard techniques.

Figure 4:
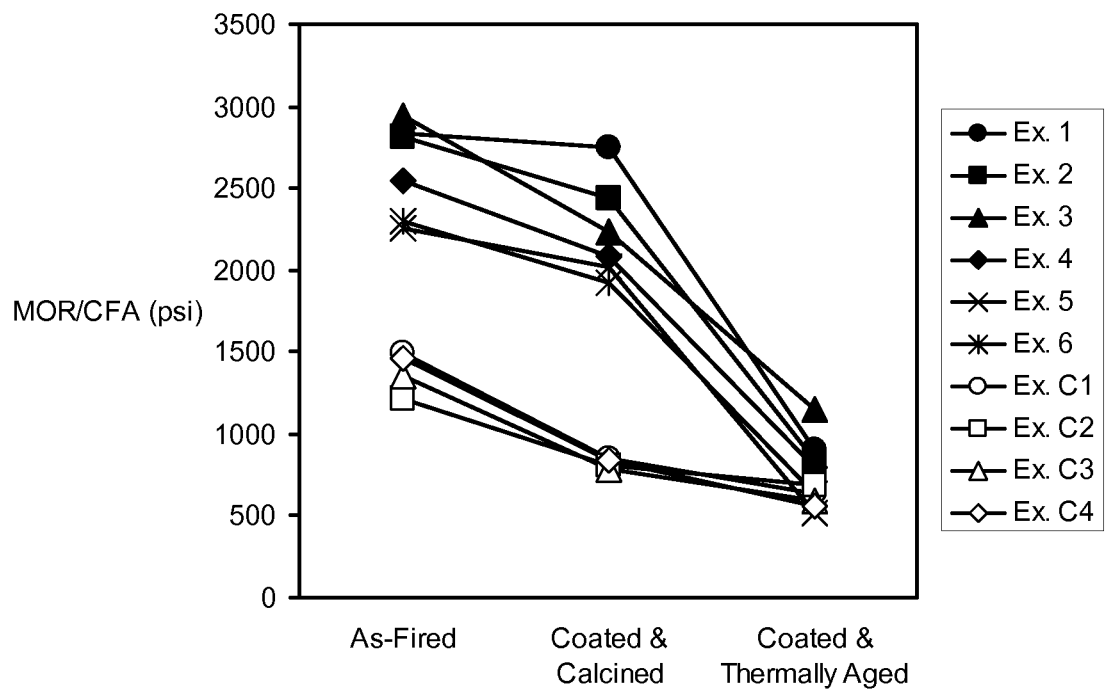
FIG. 4 graphically depicts the values of MOR/CFA for inventive and comparative examples at three conditions: (1) as-fired, (2) after washcoating and calcining, and (3) after thermal treatment at 800-1100° C., showing the higher strength retention of the Inventive Examples after washcoating.
Figure 5:
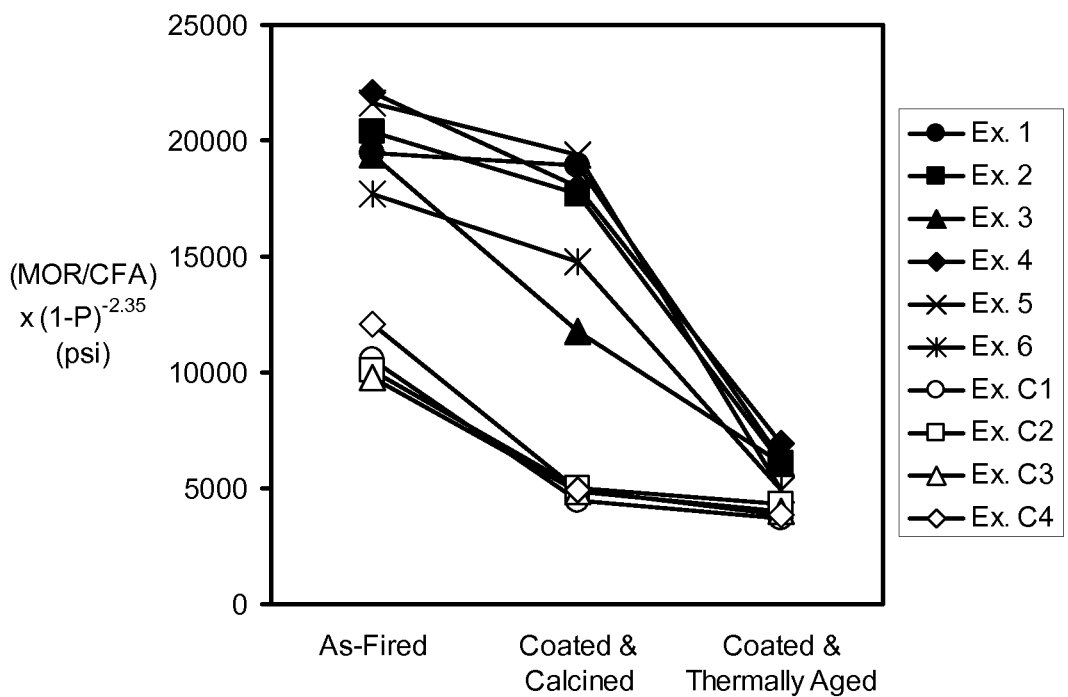
FIG. 5 graphically depicts the values of MOR*/CFA for inventive and comparative examples at three conditions: (1)

Inventive Examples 1 to 6, which contain 1% $Y_2O_3$ or 1% $La_2O_3$, in some cases with bentonite and/or feldspar, exhibited high MOR/CFA values and MOR*/CFA values after washcoating and calcination, as indicated in FIGS. 4 and 5, and a low degree of microcracking, as indicated in FIG. 6. The retention of a high MOR*/CFA values and low $Nb^3$ values after washcoating is consistent with the high values of the $S_B$ and $S_F$ parameters for these examples (FIGS. 9 to 12). Specifically referring to FIGS. 9-12, the region of FIG. 9 delimited by the boundary at $S_F \geq 12000$ and coated MOR*/CFA 10000 psi defines the Inventive Examples of the porous ceramic honeycomb articles. Similarly, in FIG. 10, the region delimited by boundary at $S_B \geq 8000$ and MOR*/CFA$\geq$10000 psi defines Inventive Examples of the porous ceramic honeycomb articles. In FIG. 11, the region delimited by the boundary at $Nb^3 \leq 0.09$ and $S_F \geq 12000$ psi defines the Inventive Examples of the porous ceramic honeycomb articles. Similarly, in FIG. 12, the region delimited by the boundary at $Nb^3 \leq 0.09$ and $S_B \geq 8000$ psi defines Inventive Examples of the porous ceramic honeycomb articles of the porous ceramic honeycomb articles.

The washcoated Inventive Examples also exhibited a ratio of $E_{500°\ C.}/E_{25°\ C.}$ of less than 1.05, as indicated in FIG. 7. After thermal treatment at 800-1100° C. for 32.5 hours, the inventive examples exhibited a first treated mean CTE(25-800° C.)$\leq 12 \times 10^{-7}$ °C.$^{-1}$, as indicated in FIG. 8, and a microcrack index $\geq 0.20$, as indicated in FIG. 6, which may be expected to provide excellent thermal shock resistance.

Inventive Example 7 was not washcoated, but was thermally treated at 850° C. for 82 hours and also at 1100° C. for 2 hours. After heating at either condition, the sample underwent a substantial increase in the microcrack index and a decrease in the first treated mean CTE(25-800° C.) to values of $10.5 \times 10^{-7}$ °C.$^{-1}$ and $12 \times 10^{-7}$ °C.$^{-1}$ at the respective thermal treatment conditions. Although no washcoating experiments were conducted on Inventive Example 7, this material was subjected to a 1 hour treatment at pH=3 followed by a calcination step to 550° C. for 1 hour. The $Nb^3$ value following this treatment was measured to be only 0.04. This shows only a small increase relative to the as-fired part, so that the part still is largely non-microcracked.

Comparative Examples C1 to C4 contain only 0.5% feldspar or 1.0% bentonite which do not yield sufficient glass to suppress microcracking to the desired levels before and after washcoating. As such, the $S_B$ and $S_F$ for Comparative Examples C1 and C4 fall outside the range of the inventive examples. Consequently, the coated MOR/CFA value and the coated MOR*/CFA are outside the inventive range after washcoating, as indicated in FIGS. 4 and 5, and the coated microcracking levels are elevated, as indicated by FIG. 6, consistent with the low values for $S_B$ and $S_F$ parameters as indicated in FIGS. 9 to 12. Penetration of the microcracks by washcoat particles is evident from the high values of $E_{500°\ C.}/E_{25°\ C.}$ for the Comparative Examples as indicated in FIG. 7.

Comparative Examples C5 and C6 contained sufficient amounts of glass-forming additives (2% feldspar+1% bentonite and high values of $S_B$ and $S_F$) to suppress microcracking and provide high strength in the as-fired and washcoated ware. However, the combination of spinel and kaolin in the raw material mixture used to form the cordierite results in a reduction in domain size in the as-fired article to dimensions which are insufficient to enable the desired degree of microcrack propagation after thermal treatment at 800-1100° C. for 32.5 hours, as indicated by the values of first treated mean $CTE(25\text{-}800° C.) > 12 \times 10^{-7}° C.^{-1}$ in FIG. 8.

Comparative Example C7 contained strontium carbonate and bentonite as glass-forming additives. Although Comparative Example C7 was not washcoated, it was found that this sample did not undergo the desired increase in microcracking after thermal treatment, as indicated by the very low microcrack index of much less than 0.20 and a first treated mean CTE much greater than $12 \times 10^{-7}° C.^{-1}$. The lack of significant microcrack growth is attributed to the use of strontium as a glass-forming additive, which serves to reduce the domain size in the ceramic by altering the nucleation and growth of the cordierite crystals. Therefore, the use of strontium as a glass-former is undesired.

To demonstrate the benefit of increased microcracking after thermal exposure on thermal shock resistance, the following experiment was undertaken. Honeycomb specimens of Examples 7 and C7 in 10.5 inch diameter by 12 inch long geometries were plugged to form diesel particulate filters and were canned and tested in an uncoated state. The testing consisted of a high stress thermal cycling test at moderate max temperature (~850° C.). The high stress was achieved by engine conditions set up to provide a high radial thermal gradient. The parts were cycled between high and low temperatures for a number of cycles, then periodically examined for cracks. 2500 cycles was used to simulate a lifetime of high stress events in application. It was found that Inventive Example 7 completed 2510 cycles without failure while Comparative Example C7 failed after less than 150 cycles. This experiment shows that the composition that undergoes an increase in microcrack density during heat treatment is able to perform well in durability trials, and that evolution of cracks has not negatively impacted the performance of the filter.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

TABLE 5

Properties of inventive examples

| | Example No. | | | | | | | | |
|---|---|---|---|---|---|---|---|---|---|
| | 1 | | | 2 | | | 3 | | |
| | Additives | | | | | | | | |
| | 1.0% $La_2O_3$ 1.0% Feldspar | | | 1.0% $La_2O_3$ 1.0% Feldspar | | | 1.0% $La_2O_3$ | | |
| Condition | As-Fired | Coated | After 800-1100° C. | As-Fired | Coated | After 800-1100° C. | As-Fired | Coated | After 800-1100° C. |
| 800-900 Heating Rate | 65 | | | 65 | | | 75 | | |
| 1150-1200 Heating Rate | 65 | | | 65 | | | 20 | | |
| 1200-1300 Heating Rate | 65 | | | 65 | | | 50 | | |
| 1300-1350 Heating Rate | 65 | | | 65 | | | 50 | | |
| 1350-Tmax Heating Rate | 28 | | | 28 | | | 50 | | |
| Tmax (° C.) | 1415 | | | 1415 | | | 1420 | | |
| Hold (h) | 12 | | | 12 | | | 15 | | |
| Nominal Cell Geometry | 300/8.5 | | | 300/8.5 | | | 275/14 | | |
| Density of Cellular Bar (g/cm³) | 0.301 | 0.325 | 0.321 | 0.295 | 0.307 | 0.297 | — | — | — |
| CFA | 0.273 | 0.273 | 0.273 | 0.273 | 0.273 | 0.273 | 0.410 | 0.410 | 0.410 |
| % Porosity | 56.0 | | | 57.0 | | | 55.2 | 50.7 | 50.7 |
| $d_1$ | 6.9 | | | 8.3 | | | 3.9 | | 0.5 |
| $d_2$ | 8.1 | | | 9.1 | | | 4.7 | | 3.4 |
| $d_5$ | 9.6 | | | 10.3 | | | 6.3 | | 5.9 |
| $d_{10}$ | 10.9 | | | 11.4 | | | 7.8 | | 7.3 |
| $d_{25}$ | 12.7 | | | 13.1 | | | 9.7 | | 9.2 |
| $d_{50}$ | 14.2 | | | 15.0 | | | 11.4 | | 10.5 |
| $d_{75}$ | 16.2 | | | 17.9 | | | 12.5 | | 11.4 |
| $d_{90}$ | 25.9 | | | 28.5 | | | 14.3 | | 13.4 |
| $d_{95}$ | 69.9 | | | 54.7 | | | 19.4 | | 20.6 |
| $d_{98}$ | 162.4 | | | 128.6 | | | 54.8 | | 76.6 |
| $d_{99}$ | 222.6 | | | 180.6 | | | 110.0 | | 150.0 |
| $d_f = (d_{50} - d_{10})/d_{50}$ | 0.23 | | | 0.24 | | | 0.32 | | 0.31 |
| $d_c = (d_{90} - d_{50})/d_{50}$ | 0.83 | | | 0.90 | | | 0.25 | | 0.27 |
| $d_b = (d_{90} - d_{10})/d_{50}$ | 1.05 | | | 1.14 | | | 0.57 | | 0.58 |
| $CTE_{25\text{-}800° C.}$ ($10^{-7}/° C.$) | 15.5 | 16.2 | 11.3 | 15.7 | 14.0 | 10.1 | 14.2 | 13.7 | 8.9 |
| $CTE_{200\text{-}1000° C.}$ ($10^{-7}/° C.$) | 19.8 | 20.5 | 15.8 | 19.4 | 18.5 | 14.8 | 18.8 | 18.2 | 13.3 |
| $CTE_{500\text{-}900° C.}$ ($10^{-7}/° C.$) | 22.7 | 23.4 | 18.4 | 22.4 | 21.4 | 17.4 | 21.8 | 21.5 | 15.6 |
| Transverse I-ratio | 0.73 | | | 0.78 | | | 0.77 | | |
| Axial I-ratio | 0.62 | | | 0.55 | | | 0.57 | | |
| Powder I-Ratio | 0.65 | | | 0.63 | | | 0.64 | | |
| % Mullite | 0.7 | | | 0.6 | | | — | | |
| % Spinel + Sapphirine | 1.0 | | | 0.8 | | | — | | |
| % Alumina | 0 | | | 0 | | | — | | |
| MOR (psi) | 773 | 751 | 246 | 767 | 666 | 229 | 1208 | 914 | 470 |
| MOR/CFA (psi) | 2832 | 2751 | 901 | 2810 | 2440 | 839 | 2946 | 2230 | 1146 |

TABLE 5-continued

Properties of inventive examples

| | Example No. | | | | | | | | |
|---|---|---|---|---|---|---|---|---|---|
| | 1 | | | 2 | | | 3 | | |
| | | | | Additives | | | | | |
| | 1.0% $La_2O_3$ 1.0% Feldspar | | | 1.0% $La_2O_3$ 1.0% Feldspar | | | 1.0% $La_2O_3$ | | |
| Condition | As-Fired | Coated | After 800-1100° C. | As-Fired | Coated | After 800-1100° C. | As-Fired | Coated | After 800-1100° C. |
| MOR*/CFA (psi) | 19494 | 18939 | 6204 | 20417 | 17728 | 6096 | 19408 | 11759 | 6041 |
| $E_{25°C.}$ ($10^5$ psi) | 5.26 | 6.15 | 3.60 | 5.50 | 4.72 | 3.15 | 9.51 | 8.96 | 6.42 |
| $E_{500°C.}$ ($10^5$ psi) | 5.13 | 6.30 | 3.75 | 5.35 | 4.81 | 3.26 | — | — | — |
| $E_{800°C.}$ ($10^5$ psi) | 5.02 | 6.18 | 4.20 | 5.23 | 4.71 | 3.58 | — | — | — |
| $E_{900°C.}$ ($10^5$ psi) | 4.85 | 6.05 | 4.56 | 4.94 | 4.54 | 3.76 | — | — | — |
| $E_{1000°C.}$ ($10^5$ psi) | 4.79 | 6.02 | 5.01 | 4.89 | 4.48 | 4.03 | — | — | — |
| $E_{500°C.}/E_{25°C.}$ | 0.975 | 1.024 | 1.042 | 0.973 | 1.019 | 1.035 | — | — | — |
| $E_{800°C.}/E_{25°C.}$ | 0.954 | 1.005 | 1.167 | 0.951 | 0.998 | 1.137 | — | — | — |
| $N_b^3$ | 0.033 | 0.052 | 0.347 | 0.024 | 0.051 | 0.264 | — | — | — |

TABLE 6

Properties of inventive examples

| | Example No. | | | | | | | | | | |
|---|---|---|---|---|---|---|---|---|---|---|---|
| | 4 | | | 5 | | | 6 | | | 7 | | |
| | | | | | | Additives | | | | | |
| | 1.0% $La_2O_3$ 1.0% Feldspar | | | 1.0% $Y_2O_3$ 1.0% Bentonite | | | 1.0% $Y_2O_3$ | | | 1.0% $Y_2O_3$ 5.0% Actigel | | |
| Condition | As-Fired | Coated | After 800-1100° C. | As-Fired | Coated | After 800-1100° C. | As-Fired | Coated | After 800-1100° C. | As-Fired | 850° C. 82 h | 1100° C. 2 h |
| 800-900 Heating Rate | 65 | | | 65 | | | 65 | | | 35 | | |
| 1150-1200 Heating Rate | 65 | | | 65 | | | 65 | | | 75 | | |
| 1200-1300 Heating Rate | 65 | | | 65 | | | 65 | | | 75 | | |
| 1300-1350 Heating Rate | 65 | | | 65 | | | 65 | | | 6 | | |
| 1350-Tmax Heating Rate | 28 | | | 28 | | | 28 | | | 6 | | |
| Tmax (° C.) | 1415 | | | 1415 | | | 1415 | | | 1426 | | |
| Hold (h) | 12 | | | 12 | | | 12 | | | 30 | | |
| Nominal Cell Geometry | 300/8.5 | | | 300/8.5 | | | 300/8.5 | | | 275/8 | | |
| Density of Cellular Bar (g/cm$^3$) | 0.267 | 0.322 | 0.299 | 0.268 | 0.306 | 0.286 | 0.280 | | 0.295 | 0.292 | 0.296 | 0.300 |
| CFA | 0.267 | 0.267 | 0.267 | 0.280 | 0.280 | 0.280 | 0.265 | 0.265 | 0.265 | 0.259 | 0.263 | 0.266 |
| % Porosity | 60.1 | | | 61.8 | | | 58.0 | | | 55.1 | — | — |
| $d_1$ | 6.8 | | | 9.9 | | | 6.3 | | | 8.2 | — | — |
| $d_2$ | 8.2 | | | 10.8 | | | 7.7 | | | 9.6 | — | — |
| $d_5$ | 10.2 | | | 12.5 | | | 9.4 | | | 11.4 | — | — |
| $d_{10}$ | 11.7 | | | 13.9 | | | 10.7 | | | 12.9 | — | — |
| $d_{25}$ | 14.1 | | | 16.3 | | | 12.6 | | | 15.4 | — | — |
| $d_{50}$ | 16.1 | | | 18.9 | | | 14.3 | | | 18.7 | — | — |
| $d_{75}$ | 18.9 | | | 23.3 | | | 16.8 | | | 23.1 | — | — |
| $d_{90}$ | 33.1 | | | 40.6 | | | 27.9 | | | 37.8 | — | — |
| $d_{95}$ | 87.9 | | | 82.7 | | | 68.9 | | | 76.9 | — | — |
| $d_{98}$ | 182.8 | | | 168.4 | | | 154.0 | | | 158.1 | — | — |
| $d_{99}$ | 241.1 | | | 225.4 | | | 208.9 | | | 205.3 | — | — |
| $d_f = (d_{50} - d_{10})/d_{50}$ | 0.27 | | | 0.26 | | | 0.25 | | | 0.31 | — | — |
| $d_c = (d_{90} - d_{50})/d_{50}$ | 1.05 | | | 1.15 | | | 0.95 | | | 1.02 | — | — |
| $d_b = (d_{90} - d_{10})/d_{50}$ | 1.33 | | | 1.41 | | | 1.20 | | | 1.33 | — | — |
| $CTE_{25-800°C.}$ ($10^{-7}$/° C.) | 14.8 | 14.8 | 11.0 | 16.7 | 15.3 | 9.7 | 14.5 | 13.5 | 8.8 | 15.0 | 10.5 | 12.0 |
| $CTE_{200-1000°C.}$ ($10^{-7}$/° C.) | 18.8 | 19.0 | 15.3 | 20.1 | 19.2 | 13.7 | 18.4 | 16.5 | 13.0 | 19.4 | 14.9 | 16.1 |
| $CTE_{500-900°C.}$ ($10^{-7}$/° C.) | 21.6 | 21.5 | 16.0 | 23.4 | 22.2 | 16.2 | 21.1 | 21.0 | 16.1 | 22.6 | 17.5 | 18.5 |
| Transverse I-ratio | 0.79 | | | 0.77 | | | 0.81 | | | 0.74 | | |
| Axial I-ratio | 0.60 | | | 0.59 | | | 0.57 | | | 0.58 | | |
| Powder I-Ratio | 0.65 | | | 0.64 | | | 0.65 | | | 0.65 | | |
| % Mullite | 0.5 | | | 0.7 | | | 0 | | | 0.0 | | |
| % Spinel + Sapphirine | 0.9 | | | 0.7 | | | 1.1 | | | 1.2 | | |
| % Alumina | 0 | | | 0 | | | 0 | | | 0.0 | | |
| MOR (psi) | 680 | 555 | 213 | 631 | 565 | 143 | 610 | 509 | 169 | 739 | 481 | 419 |
| MOR/CFA (psi) | 2547 | 2079 | 798 | 2254 | 2018 | 511 | 2302 | 1921 | 638 | 2850 | 1830 | 1573 |

TABLE 6-continued

Properties of inventive examples

| | Example No. | | | | | | | | | | |
|---|---|---|---|---|---|---|---|---|---|---|---|
| | 4 | | | 5 | | | 6 | | | 7 | |
| | Additives | | | | | | | | | | |
| | 1.0% $La_2O_3$ 1.0% Feldspar | | | 1.0% $Y_2O_3$ 1.0% Bentonite | | | 1.0% $Y_2O_3$ | | | 1.0% $Y_2O_3$ 5.0% Actigel | |
| | | | After | | | After | | | After | | |
| Condition | As-Fired | Coated | 800-1100° C. | As-Fired | Coated | 800-1100° C. | As-Fired | Coated | 800-1100° C. | As-Fired | 850° C. 82 h | 1100° C. 2 h |
| MOR*/CFA (psi) | 22065 | 18009 | 6912 | 21628 | 19366 | 4902 | 17679 | 14751 | 4898 | 18748 | 12038 | 10346 |
| $E_{25° C.}$ ($10^5$ psi) | 3.71 | 5.16 | 3.25 | 3.54 | 4.54 | 2.40 | 3.97 | 3.86 | 2.46 | 4.82 | 4.03 | 3.83 |
| $E_{500° C.}$ ($10^5$ psi) | 3.61 | 5.25 | 3.35 | 3.47 | 4.72 | 2.50 | 3.87 | 4.02 | 2.57 | 4.69 | 4.00 | 3.88 |
| $E_{800° C.}$ ($10^5$ psi) | 3.51 | 5.11 | 3.67 | 3.35 | 4.61 | 2.76 | 3.79 | 3.93 | 2.84 | 4.57 | 4.08 | 3.97 |
| $E_{900° C.}$ ($10^5$ psi) | 3.37 | 4.98 | 3.89 | 3.18 | 4.43 | 2.97 | 3.69 | 3.86 | 3.06 | 4.41 | 4.14 | 4.19 |
| $E_{1000° C.}$ ($10^5$ psi) | 3.33 | 4.95 | 4.13 | 3.07 | 4.52 | 3.21 | 3.49 | 3.69 | 3.34 | 3.89 | 4.24 | 4.20 |
| $E_{500° C.}/E_{25° C.}$ | 0.973 | 1.017 | 1.031 | 0.980 | 1.040 | 1.042 | 0.975 | 1.041 | 1.045 | 0.973 | 0.993 | 1.013 |
| $E_{800° C.}/E_{25° C.}$ | 0.946 | 0.990 | 1.129 | 0.946 | 1.015 | 1.150 | 0.955 | 1.018 | 1.154 | 0.948 | 1.012 | 1.037 |
| $Nb^3$ | 0.025 | 0.048 | 0.261 | 0.015 | 0.068 | 0.318 | 0.032 | 0.076 | 0.333 | 0.020 | 0.125 | 0.186 |

TABLE 7

Properties of comparative examples

| | Example No. | | | | | | | | |
|---|---|---|---|---|---|---|---|---|---|
| | C1 | | | C2 | | | C3 | | |
| | Additives | | | | | | | | |
| | 0.5% Feldspar | | | 1.0% Bentonite | | | 0.5% Feldspar | | |
| Condition | As-Fired | Coated | After 800-1100° C. | As-Fired | Coated | After 800-1100° C. | As-Fired | Coated | After 800-1100° C. |
| 800-900 Heating Rate | 65 | | | 65 | | | 65 | | |
| 1150-1200 Heating Rate | 65 | | | 65 | | | 65 | | |
| 1200-1300 Heating Rate | 65 | | | 65 | | | 65 | | |
| 1300-1350 Heating Rate | 65 | | | 65 | | | 65 | | |
| 1350-Tmax Heating Rate | 28 | | | 28 | | | 28 | | |
| Tmax (° C.) | 1415 | | | 1415 | | | 1415 | | |
| Hold (h) | 12 | | | 12 | | | 12 | | |
| Nominal Cell Geometry | 300/8.5 | | | 300/8.5 | | | 300/8.5 | | |
| Density of Cellular Bar (g/cm³) | 0.285 | 0.289 | 0.293 | 0.273 | 0.295 | 0.294 | 0.287 | 0.300 | 0.296 |
| CFA | 0.261 | 0.232 | 0.249 | 0.269 | 0.256 | 0.257 | 0.266 | 0.259 | 0.266 |
| % Porosity | 56.5 | 50.4 | 53.0 | 59.5 | 54.0 | 54.4 | 57.0 | 53.8 | 55.6 |
| $d_1$ | 9.1 | 0.4 | 0.0 | 7.3 | 2.8 | 0.0 | 10.3 | 0.4 | 0.0 |
| $d_2$ | 10.4 | 1.0 | 0.0 | 8.8 | 5.7 | 0.0 | 12.0 | 1.2 | 0.0 |
| $d_5$ | 12.2 | 3.4 | 0.0 | 10.7 | 8.4 | 0.0 | 13.9 | 5.6 | 0.0 |
| $d_{10}$ | 13.6 | 6.2 | 3.9 | 12.3 | 10.6 | 0.0 | 15.4 | 10.0 | 3.2 |
| $d_{25}$ | 15.9 | 13.7 | 14.9 | 14.8 | 13.0 | 9.0 | 18.2 | 14.8 | 16.2 |
| $d_{50}$ | 18.3 | 17.9 | 19.3 | 17.1 | 15.2 | 19.2 | 21.3 | 18.5 | 22.9 |
| $d_{75}$ | 21.5 | 22.5 | 24.4 | 20.1 | 18.1 | 23.9 | 26.4 | 24.1 | 30.2 |
| $d_{90}$ | 40.1 | 61.3 | 52.9 | 33.6 | 38.9 | 51.3 | 46.6 | 58.9 | 64.4 |
| $d_{95}$ | 93.7 | 157.9 | 132.8 | 79.6 | 116.1 | 140.9 | 88.9 | 146.8 | 148.1 |
| $d_{98}$ | 181.6 | 263.0 | 254.4 | 170.9 | 228.1 | 271.6 | 170.4 | 258.1 | 276.8 |
| $d_{99}$ | 251.4 | 305.4 | 329.0 | 242.1 | 278.6 | 342.6 | 237.2 | 304.2 | 347.1 |
| $d_f = (d_{50} - d_{10})/d_{50}$ | 0.26 | 0.66 | 0.80 | 0.28 | 0.30 | 1.00 | 0.28 | 0.46 | 0.86 |
| $d_c = (d_{90} - d_{50})/d_{50}$ | 1.19 | 2.41 | 1.74 | 0.96 | 1.57 | 1.67 | 1.19 | 2.18 | 1.82 |
| $d_b = (d_{90} - d_{10})/d_{50}$ | 1.45 | 3.07 | 2.54 | 1.25 | 1.87 | 2.66 | 1.46 | 2.64 | 2.68 |
| $CTE_{25-800° C.}$ ($10^{-7}$/° C.) | 14.0 | 13.0 | 8.3 | 12.9 | 11.4 | 8.2 | 15.2 | 11.9 | 11.1 |
| $CTE_{200-1000° C.}$ ($10^{-7}$/° C.) | 18.1 | 17.7 | 13.0 | 17.8 | 16.4 | 13.0 | 18.5 | 16.3 | 15.4 |
| $CTE_{500-900° C.}$ ($10^{-7}$/° C.) | 20.4 | 19.7 | 15.5 | 20.0 | 18.7 | 15.5 | 20.5 | 17.3 | 17.7 |
| Transverse I-ratio | 0.79 | | | 0.78 | | | 0.78 | | |
| Axial I-ratio | 0.58 | | | 0.60 | | | 0.58 | | |
| Powder I-Ratio | 0.57 | | | 0.60 | | | 0.58 | | |
| % Mullite | 1.6 | | | 1.6 | | | 1.8 | | |
| % Spinel + Sapphirine | 0.9 | | | 2.2 | | | 2.6 | | |
| % Alumina | 0 | | | 0 | | | 0 | | |
| MOR (psi) | 389 | 198 | 157 | 325 | 207 | 176 | 359 | 204 | 158 |
| MOR/CFA (psi) | 1490 | 853 | 631 | 1208 | 809 | 685 | 1350 | 788 | 594 |
| MOR*/CFA (psi) | 10540 | 4434 | 3718 | 10107 | 5015 | 4335 | 9808 | 4835 | 4003 |

TABLE 7-continued

Properties of comparative examples

| | Example No. | | | | | | | | |
|---|---|---|---|---|---|---|---|---|---|
| | C1 | | | C2 | | | C3 | | |
| | Additives | | | | | | | | |
| | 0.5% Feldspar | | | 1.0% Bentonite | | | 0.5% Feldspar | | |
| Condition | As-Fired | Coated | After 800-1100° C. | As-Fired | Coated | After 800-1100° C. | As-Fired | Coated | After 800-1100° C. |
| $E_{25° C.}$ ($10^5$ psi) | 4.13 | 3.17 | 2.70 | 3.04 | 3.36 | 2.62 | 3.74 | 2.86 | 2.37 |
| $E_{500° C.}$ ($10^5$ psi) | 4.06 | 3.74 | 2.99 | 2.99 | 3.96 | 2.88 | 3.67 | 3.38 | 2.58 |
| $E_{800° C.}$ ($10^5$ psi) | 4.07 | 3.68 | 3.66 | 2.96 | 3.93 | 3.39 | 3.63 | 3.33 | 3.04 |
| $E_{900° C.}$ ($10^5$ psi) | 4.15 | 3.66 | 3.94 | 2.99 | 3.91 | 3.61 | 3.70 | 3.32 | 3.21 |
| $E_{1000° C.}$ ($10^5$ psi) | 4.22 | 3.63 | 4.08 | 3.02 | 3.88 | 3.73 | 3.74 | 3.29 | 3.30 |
| $E_{500° C.}/E_{25° C.}$ | 0.983 | 1.180 | 1.107 | 0.984 | 1.179 | 1.099 | 0.981 | 1.182 | 1.089 |
| $E_{800° C.}/E_{25° C.}$ | 0.985 | 1.161 | 1.356 | 0.974 | 1.170 | 1.294 | 0.971 | 1.164 | 1.283 |
| $Nb^3$ | 0.094 | 0.157 | 0.377 | 0.070 | 0.163 | 0.330 | 0.066 | 0.162 | 0.305 |

TABLE 8

Properties of comparative examples

| | Example No. | | | | | |
|---|---|---|---|---|---|---|
| | C4 | | | C5 | | |
| | Additives | | | | | |
| | 1.0% Bentonite | | | 2.0% Feldspar 1.0% Bentonite | | |
| Condition | As-Fired | Coated | After 800-1100° C. | As-Fired | Coated | After 800-1100° C. |
| 800-900 Heating Rate | 65 | | | 75 | | |
| 1150-1200 Heating Rate | 65 | | | 20 | | |
| 1200-1300 Heating Rate | 65 | | | 50 | | |
| 1300-1350 Heating Rate | 65 | | | 50 | | |
| 1350-Tmax Heating Rate | 28 | | | 50 | | |
| Tmax (° C.) | 1415 | | | 1420 | | |
| Hold (h) | 12 | | | 15 | | |
| Nominal Cell Geometry | 300/8.5 | | | 239/7.55 | | |
| Density of Cellular Bar (g/cm$^3$) | 0.275 | 0.291 | 0.294 | 0.229 | — | — |
| CFA | 0.270 | 0.246 | 0.266 | 0.234 | 0.234 | 0.234 |
| % Porosity | 59.4 | 52.9 | 55.9 | 61.0 | | |
| $d_1$ | 9.6 | 1.2 | 0.0 | 0.2 | | |
| $d_2$ | 10.7 | 2.8 | 0.0 | 5.0 | | |
| $d_5$ | 12.5 | 6.0 | 0.0 | 13.3 | | |
| $d_{10}$ | 14.0 | 9.7 | 0.0 | 15.0 | | |
| $d_{25}$ | 16.4 | 14.2 | 7.8 | 17.2 | | |
| $d_{50}$ | 19.7 | 17.8 | 21.2 | 19.0 | | |
| $d_{75}$ | 24.9 | 23.8 | 28.6 | 22.1 | | |
| $d_{90}$ | 44.6 | 57.6 | 53.5 | 29.2 | | |
| $d_{95}$ | 86.1 | 139.4 | 120.2 | 48.6 | | |
| $d_{98}$ | 173.9 | 248.5 | 250.5 | 110.8 | | |
| $d_{99}$ | 254.5 | 298.3 | 329.4 | 158.7 | | |
| $d_f = (d_{50} - d_{10})/d_{50}$ | 0.29 | 0.46 | 1.00 | 0.21 | | |
| $d_c = (d_{90} - d_{50})/d_{50}$ | 1.26 | 2.23 | 1.53 | 0.54 | | |
| $d_b = (d_{90} - d_{10})/d_{50}$ | 1.55 | 2.69 | 2.53 | 0.75 | | |
| $CTE_{25-800° C.}$ ($10^{-7}$/° C.) | 14.9 | 13.2 | 10.4 | 16.6 | 16.1 | 15.2 |
| $CTE_{200-1000° C.}$ ($10^{-7}$/° C.) | 18.8 | 17.3 | 14.2 | 21.0 | 20.7 | 19.8 |
| $CTE_{500-900° C.}$ ($10^{-7}$/° C.) | 20.1 | 18.1 | 16.6 | 23.5 | 23.3 | 22.6 |
| Transverse I-ratio | 0.78 | | | 0.73 | | |
| Axial I-ratio | 0.58 | | | 0.65 | | |
| Powder I-Ratio | 0.58 | | | 0.65 | | |
| % Mullite | 1.4 | | | — | | |
| % Spinel + Sapphirine | 3.0 | | | — | | |
| % Alumina | 0.0 | | | — | | |
| MOR (psi) | 393 | 207 | 149 | 645 | 735 | 236 |
| MOR/CFA (psi) | 1456 | 841 | 560 | 2754 | 3141 | 1008 |
| MOR*/CFA (psi) | 12106 | 4937 | 3836 | 25207 | 28753 | 9229 |
| $E_{25° C.}$ ($10^5$ psi) | 3.42 | 2.86 | 2.59 | 2.76 | 3.73 | 3.01 |
| $E_{500° C.}$ ($10^5$ psi) | 3.36 | 3.31 | 2.81 | 2.69 | — | — |
| $E_{800° C.}$ ($10^5$ psi) | 3.29 | 3.27 | 3.24 | 2.62 | — | — |
| $E_{900° C.}$ ($10^5$ psi) | 3.32 | 3.23 | 3.44 | 2.60 | — | — |

TABLE 8-continued

| Properties of comparative examples | | | | | | |
|---|---|---|---|---|---|---|
| $E_{1000°\,C.}$ ($10^5$ psi) | 3.34 | 3.20 | 3.55 | 2.56 | — | — |
| $E_{500°\,C.}/E_{25°\,C.}$ | 0.982 | 1.157 | 1.085 | 0.975 | — | — |
| $E_{800°\,C.}/E_{25°\,C.}$ | 0.962 | 1.143 | 1.251 | 0.949 | — | — |
| $Nb^3$ | 0.048 | 0.146 | 0.298 | 0.016 | — | — |

| | Example No. | | | | | |
|---|---|---|---|---|---|---|
| | C6 | | | C7 | | |
| | Additives | | | | | |
| | 2.0% Feldspar 1.0% Bentonite | | | 1.5% SrCO$_3$ 2.5% Bentonite | | |
| Condition | As-Fired | Coated | After 800-1100° C. | As-Fired | 850° C. 82 h | 1100° C. 2 h |
| 800-900 Heating Rate | 75 | | | 35 | | |
| 1150-1200 Heating Rate | 75 | | | 25 | | |
| 1200-1300 Heating Rate | 75 | | | 25 | | |
| 1300-1350 Heating Rate | 6 | | | 25 | | |
| 1350-Tmax Heating Rate | 6 | | | 5 | | |
| Tmax (° C.) | 1420 | | | 1415 | | |
| Hold (h) | 12 | | | 11 | | |
| Nominal Cell Geometry | 220/7.7 | | | 200/9 | | |
| Density of Cellular Bar (g/cm$^3$) | 0.220 | — | — | 0.291 | 0.287 | 0.296 |
| CFA | 0.214 | 0.214 | 0.214 | 0.275 | 0.271 | 0.280 |
| % Porosity | 59.0 | | | 57.8 | | |
| $d_1$ | 10.1 | | | 5.9 | | |
| $d_2$ | 11.0 | | | 7.3 | | |
| $d_5$ | 12.6 | | | 8.7 | | |
| $d_{10}$ | 13.8 | | | 9.9 | | |
| $d_{25}$ | 15.7 | | | 11.8 | | |
| $d_{50}$ | 17.4 | | | 14.4 | | |
| $d_{75}$ | 20.5 | | | 17.6 | | |
| $d_{90}$ | 29.3 | | | 26.4 | | |
| $d_{95}$ | 58.1 | | | 46.5 | | |
| $d_{98}$ | 140.7 | | | 114.0 | | |
| $d_{99}$ | 196.8 | | | 175.0 | | |
| $d_f = (d_{50} - d_{10})/d_{50}$ | 0.21 | | | 0.31 | | |
| $d_c = (d_{90} - d_{50})/d_{50}$ | 0.68 | | | 0.83 | | |
| $d_b = (d_{90} - d_{10})/d_{50}$ | 0.89 | | | 1.15 | | |
| $CTE_{25-800°\,C.}$ ($10^{-7}/°$ C.) | 16.7 | 16.3 | 14.7 | 17.6 | 17.7 | 14.7 |
| $CTE_{200-1000°\,C.}$ ($10^{-7}/°$ C.) | 20.5 | 20.9 | 19.0 | 21.2 | 21.2 | 19.3 |
| $CTE_{500-900°\,C.}$ ($10^{-7}/°$ C.) | 22.9 | 23.3 | 21.6 | 23.7 | 23.9 | 21.6 |
| Transverse I-ratio | 0.76 | | | 0.64 | | |
| Axial I-ratio | 0.61 | | | 0.65 | | |
| Powder I-Ratio | 0.65 | | | 0.64 | | |
| % Mullite | — | | | — | | |
| % Spinel + Sapphirine | — | | | — | | |
| % Alumina | — | | | — | | |
| MOR (psi) | 607 | 630 | 193 | 839 | 826 | 668 |
| MOR/CFA (psi) | 2841 | 2948 | 901 | 3052 | 3048 | 2389 |
| MOR*/CFA (psi) | 23100 | 23974 | 7328 | 23214 | 23184 | 18173 |
| $E_{25°\,C.}$ ($10^5$ psi) | 2.98 | 3.45 | 2.92 | 4.71 | 4.42 | 4.58 |
| $E_{500°\,C.}$ ($10^5$ psi) | 2.90 | — | — | — | 4.31 | 4.42 |
| $E_{800°\,C.}$ ($10^5$ psi) | 2.85 | — | — | — | 4.20 | 4.28 |
| $E_{900°\,C.}$ ($10^5$ psi) | 2.83 | — | — | — | 4.04 | 4.18 |
| $E_{1000°\,C.}$ ($10^5$ psi) | 2.80 | — | — | — | 3.46 | 3.80 |
| $E_{500°\,C.}/E_{25°\,C.}$ | 0.973 | — | — | — | 0.975 | 0.965 |
| $E_{800°\,C.}/E_{25°\,C.}$ | 0.956 | — | — | — | 0.950 | 0.934 |
| $Nb^3$ | 0.024 | — | — | — | 0.019 | 0.015 |

TABLE 9

Heating cycle for thermal treatment of washcoated samples

| Starting Temperature of Segment (° C.) | Ending Temperature of Segment (° C.) | Temperature Change with Time (° C./h) | Total Time of Segment (h) |
|---|---|---|---|
| 25 | 800 | 100 | 7.750 |
| 800 | 900 | 17 | 5.882 |
| 900 | 1000 | 60 | 1.667 |
| 1000 | 1100 | 200 | 0.500 |
| 1100 | 1100 | 0 | 0.150 |
| 1100 | 1000 | −200 | 0.500 |
| 1000 | 900 | −60 | 1.667 |
| 900 | 800 | −17 | 5.882 |
| 800 | 900 | 17 | 5.882 |
| 900 | 1000 | 60 | 1.667 |

TABLE 9-continued

Heating cycle for thermal treatment of washcoated samples

| Starting Temperature of Segment (° C.) | Ending Temperature of Segment (° C.) | Temperature Change with Time (° C./h) | Total Time of Segment (h) |
| --- | --- | --- | --- |
| 1000 | 1100 | 200 | 0.500 |
| 1100 | 1100 | 0 | 0.150 |
| 1100 | 1000 | −200 | 0.500 |
| 1000 | 900 | −60 | 1.667 |
| 900 | 800 | −17 | 5.882 |
| 800 | 25 | −100 | 7.750 |

TABLE 10

Cumulative time above various temperatures in heating cycle of Table 12

| Temperature (° C.) | Cumulative Time above Temperature (h) |
| --- | --- |
| 800 | 32.50 |
| 850 | 20.73 |
| 900 | 8.97 |
| 950 | 5.63 |
| 1000 | 2.30 |
| 1050 | 1.30 |
| 1100 | 0.30 |

What is claimed is:

1. A method for forming a porous ceramic honeycomb article, the method comprising:
forming a batch mixture comprising cordierite-forming raw materials, glass-forming raw materials, at least one ceramic processing aid and water;
extruding the batch mixture into a green honeycomb article;
firing the green honeycomb article under conditions sufficient to produce the porous ceramic honeycomb article having a primary cordierite phase and an intercrystalline glass phase, wherein, after firing, the porous ceramic honeycomb article exhibits an as-fired microcrack parameter $Nb^3 \leq 0.06$;
washcoating and calcining the porous ceramic honeycomb article, wherein the porous ceramic honeycomb article exhibits a coated microcrack parameter $Nb^3 \leq 0.14$ and a coated $E_{500° C.}/E_{25° C.}$ ratio $\leq 1.06$ after washcoating and calcining; and
thermally treating the porous ceramic honeycomb article, wherein at least a first portion of the porous ceramic honeycomb article exhibits a first treated microcrack parameter $Nb^3 \geq 0.20$, and a first treated mean coefficient of thermal expansion of less than $12 \times 10^{-7}/° C.$ over a temperature range of 25° C. to 800° C. after the thermal treating;
wherein the primary cordierite phase comprises domains of cordierite crystallites having a domain length parameter ≥40 microns, the cordierite crystallites having a subparallel orientation with one another within the domains, and
further wherein an orientation of the cordierite crystallites within the domains differs between adjacent domains.

2. The method of claim 1, wherein the intercrystalline glass phase comprises at least about 4 wt. % of the porous ceramic honeycomb article and pockets of the intercrystalline glass phase are positioned among the cordierite crystallites within the domains and between the domains, the pockets having a maximum dimension from about 0.5 microns to about 10 microns.

3. The method of claim 1, wherein the porous ceramic honeycomb article has an as-fired MOR/CFA value ≥1600 psi and a coated MOR/CFA value ≥1600 psi, wherein the coated MOR/CFA value is ≥60% of the as-fired MOR/CFA value.

4. The method of claim 1, wherein the porous ceramic honeycomb article has a coated MOR*/CFA value ≥10 kpsi after washcoating and calcining the porous ceramic honeycomb article and prior to heat treating the porous ceramic honeycomb article.

5. The method of claim 4, wherein:
the glass-forming raw materials are selected from the list consisting of yttrium oxide powder, lanthanum oxide powder, alkali feldspar powder, bentonite powder, attapulgite powder and combinations thereof;

coated $MOW/CFA = 2134 + S_B$, wherein $S_B = 9300Y_{LaP} + 13400Y_{YP} + 6000Y_{FP} + 2400Y_{BP} + 1000Y_{AP}$;

$Y_{LaP}$ is a weight percent of lanthanum oxide powder in the batch mixture, $Y_{YP}$ is a weight percent of yttrium oxide powder in the batch mixture, $Y_{FP}$ is a weight percent of alkali feldspar powder in the batch mixture, $Y_{BP}$ is a weight percent of bentonite powder in the batch mixture, $Y_{AP}$ is a weight percent of attapulgite powder in the batch mixture; and $S_B \geq 8000$.

6. The method of claim 4, wherein:
the intercrystalline glass phase is a magnesium aluminosilicate intercrystalline glass phase which contains at least one metal oxide selected from the list consisting of yttrium oxide, lanthanum oxide, potassium oxide, calcium oxide and combinations thereof; and coated $MOW/CFA = -1415 + S_F$, wherein $S_F = 9200X_{La} + 1300X_Y + 50000X_K + 36200X_{Ca}$;

$X_{La}$ is a weight percent of lanthanum oxide in the porous ceramic honeycomb article, $X_Y$ is a weight percent of yttrium oxide in the porous ceramic honeycomb article, $X_K$ is a weight percent of potassium oxide in the porous ceramic honeycomb article, $X_{Ca}$ is a weight percent of calcium oxide in the porous ceramic honeycomb article; and $S_F \geq 12000$.

7. The method of claim 1, wherein thermally treating the porous ceramic honeycomb article comprises exposing at least the first portion of the porous ceramic honeycomb article to a treatment temperature greater than a devitrification temperature of the intercrystalline glass phase, wherein the devitrification ≥ temperature a temperature at which the intercrystalline glass phase undergoes at least a partial degree of devitrification.

8. The method of claim 7, wherein the devitrification temperature of the intercrystalline glass phase is greater than about 800° C.

9. The method of claim 7, wherein the treatment temperature is in a range from about 800° C. to about 1100° C.

10. The method of claim 1, wherein the porous ceramic honeycomb article is thermally treated by flowing a heated gas through at least the first portion of the porous ceramic honeycomb article, wherein a temperature of the heated gas is greater than a devitrification temperature of the intercrystalline glass phase.

11. The method of claim 1, wherein the cordierite-forming raw materials are selected from the group consisting of talc, chlorite, kaolin, calcined kaolin, an aluminum oxide-forming source, a silica powder source and combinations thereof.

12. The method of claim 1, wherein the cordierite-forming raw materials are selected from the group consisting of talc, a magnesium oxide forming source, an aluminum oxide forming source, and a silica powder source and combinations thereof.

13. The method of claim 1, wherein the cordierite-forming raw materials are not chosen from:
   (1) pre-reacted cordierite powders;
   (2) magnesium aluminosilicate glass powders;
   (3) a combination of magnesium aluminate spinel and a kaolin or calcined kaolin;
   (4) a combination of a magnesium oxide-forming source and a kaolin or calcined kaolin.

* * * * *